United States Patent [19]

Carlsson et al.

[11] E Re. 28,532

[45] Reissued Aug. 26, 1975

[54] 5-FLUORO-3-PYRIDINEMETHANOL, ESTERS THEREOF AND THERAPEUTICALLY ACCEPTABLE SALTS THEREOF

[75] Inventors: Lars Anders Fritz Carlsson, Bromma; Åke John Erik Helgstrand, Enhorna; Berndt Olof Harald Sjöberg; Nils Erik Stjernstrom, both of Sodertalje, all of Sweden

[73] Assignee: Aktiebolaget Astra, Sodertalje, Sweden

[22] Filed: Apr. 16, 1973

[21] Appl. No.: 351,271

Related U.S. Patent Documents

Reissue of:

[64] Patent No.: 3,637,714
Issued: Jan. 25, 1972
Appl. No.: 689,751
Filed: Nov. 15, 1967

[30] Foreign Application Priority Data

Nov. 16, 1966 Sweden .....15717/66
Mar. 23, 1967 United Kingdom.....13687/67
Apr. 26, 1967 United Kingdom.....19174/67

[52] U.S. Cl...260/294.8 R; 260/295 S; 260/295 R; 260/297 R; 260/295.5 A; 424/263; 424/266

[51] Int. Cl...... C07d 31/36

[58] Field of Search.. 260/295.5 R, 297 R, 294.8 R, 260/295 S

[56] References Cited

UNITED STATES PATENTS 3,557,131 1/1971 Yoshimura et al. ..... 260/295.5

OTHER PUBLICATIONS

Beaty et al., Chem. Abstracts, Vol. 46, (18), 8654a–b, Sept. 25, 1952.

Beaty et al., J. Chem. Soc., London, p. 3512, 1951, QB1 C. 6.

*Primary Examiner*—Alan L. Rotman
*Attorney, Agent, or Firm*—Brumbaugh, Graves, Donohue & Raymond

[57] ABSTRACT

The invention relates to 3.5-substituted pyridines, which in one of the positions 3 and 5 may be substituted by halogen or $—NH_2$, and in the other position are substituted by an organic group. The compounds are useful for the inhibition of serum lipid mobilization.

2 Claims, No Drawings

5-FLUORO-3-PYRIDINEMETHANOL, ESTERS THEREOF AND THERAPEUTICALLY ACCEPTABLE SALTS THEREOF

Matter enclosed in heavy brackets [ ] appears in the original patent but forms no part of this reissue specification; matter printed in italics indicates the additions made by reissue.

---

The present invention relates to serum lipid lowering pyridine derivatives also having vasodilating properties, their preparation and pharmaceutical preparations containing them.

In view of accumulating evidence indicating that excessive serum lipid concentration is correlated to basic pathogenetic mechanisms and to symptoms of several diseases such as vascular diseases, diabetes mellitus, and hyperthyroidism, lowering of serum lipid concentration is important during treatment of such diseases.

The lowering of serum lipid concentration may be obtained by inhibition of lipid mobilization, e.g. by a decrease in the net release of lipids to the circulation in the form of free fatty acids, from stored triglycerides in adipose tissue.

It has now been found that compounds of the general formula

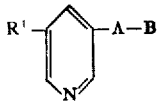

and therapeutically acceptable salts thereof have vasodilating properties and are of particular value of lowering of excessive serum lipid concentration, in which formula $R^1$ is hydrogen, halogen or $NH_2$, A is a radical selected from the class consisting of

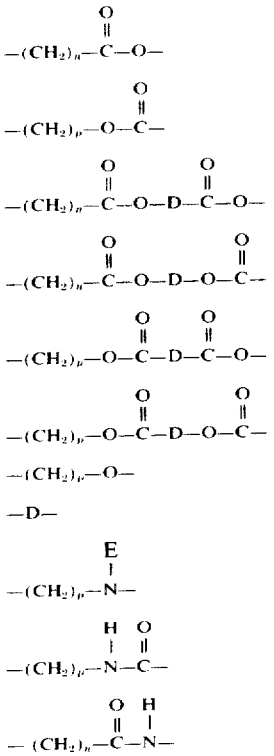

and

B and E are members of the class consisting of hydrogen, straight, branched, saturated and unsaturated alkyl groups containing at most 12 carbon atoms; the group of atoms —D—B containing at most 12 carbon atoms when B is alkyl; cycloalkyl, phenylalkyl, alkyloxyalkyl, aryloxyalkyl, aminoalkyl, lower alkylaminoalkyl, dialkylaminoalkyl,

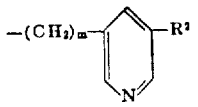

(1)

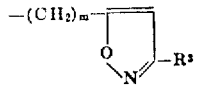

(2)

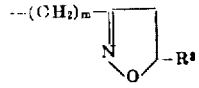

(3)

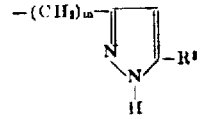

(4)

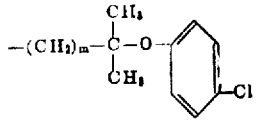

(5)

when A is $-(CH_2)_p-O-B$ can also be pyranyl and, when A is

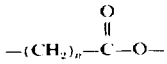

B can also be a member of the group consisting of

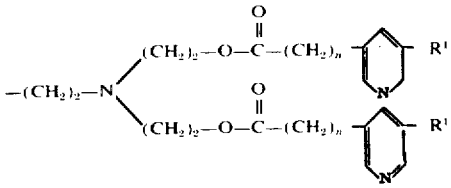

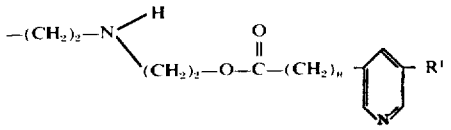

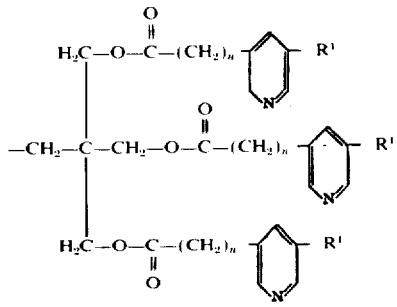

and

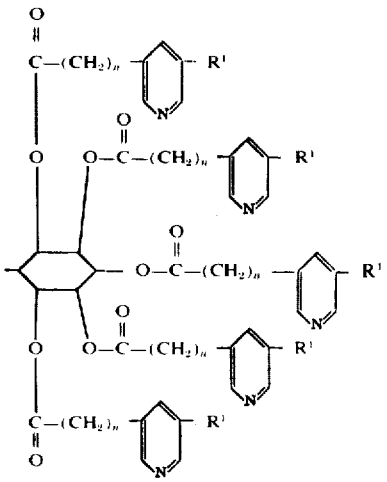

B not being hydrogen when A is

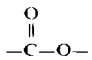

and $R^1$ is H; B not being hydrogen when A is

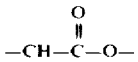

and $R^1$ is a member of the group consisting of hydrogen, halogen and $-NH_2$; in which formulas n is an integer from 0 to 3 inclusive, $R^1$ being hydrogen when n is 1; p is an integer from 1 to 4 inclusive, $R^1$ being hydrogen when p is 2; m is an integer from 0 to 4 inclusive, m being > 0 when B is a member of the class consisting of the radicals (1)-(4), and is linked to A via a member of the group consisting of oxygen and nitrogen atoms;

$R^2$ is a member of the group consisting of hydrogen, halogen and $-NH_2$ $R^3$ is a member of the group consisting of hydrogen, halogen, $-NH_2$, straight, branched, saturated and unsaturated alkyl groups; D is selected from the class consisting of straight, branched saturated and unsaturated alkylene groups containing at most 6 carbon atoms;

the group of atoms —A—B can also be a member of the class consisting of

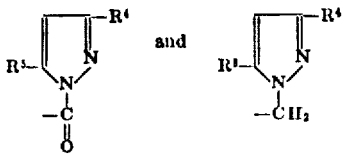

wherein $R^4$ and $R^5$ are selected from the class consisting of straight, branched, saturated, and unsaturated alkyl groups, hydroxylalkyl and carboxyalkyl groups.

The expression "therapeutically acceptable salt" is recognized in the art to designate an acid addition salt, which is physiologically innocuous when administered in a dosage and at an interval (e.g. frequency of administration) that is effective for the indicated therapeutic use of the parent compound. Typical therapeutically acceptable acid addition salts include but are not limited to the salts of mineral acids, such as hydrochloric, hydrobromic, phosphoric or sulphuric acid, organic acids such as acetic lactic, levulinic, citric, fumaric, maleic, succinic, tartaric benzoic acid and sulphonic acids, such as methane sulphonic acid and sulphamic acid.

The present invention further provides processes for the preparation of above mentioned compounds.

The compounds used as starting materials in the different processes may be prepared according to known methods.

(a) Compounds of the formula

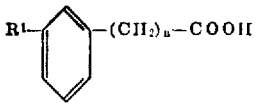

(6)

wherein n is one of the integers 0, 2 and 3, and $R^1$ is hydrogen, halogen or $-NH_2$, $R^1$ being halogen when n is 0, may be prepared according to the following reaction schemes:

(1) Arndt-Eistert method

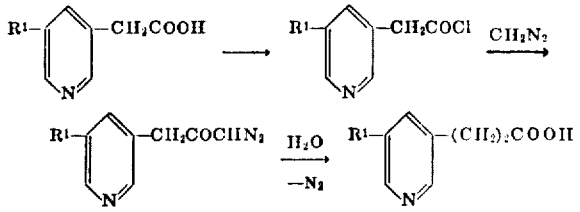

The homologues are prepared analogously.

(2) Preparation by the general method

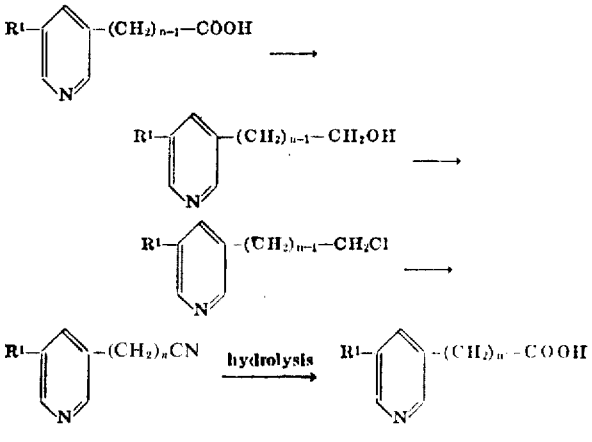

(3) Preparation by carbonation of Grignard reagents (X is halogen)

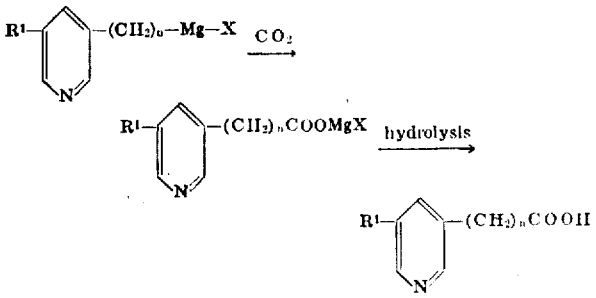

(4) Preparation by oxidation of the corresponding alcohol or aldehyde

A specific method for the preparation of

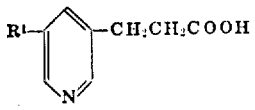

is reduction of the corresponding 3-acrylic acid,

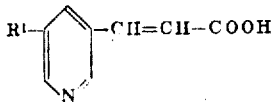

The pyridine acrylic acid may be prepared by condensation of 5-substituted 3-pyridinecarboxaldehyde with malonic acid, or (by the similar Perkin and Claisen condensations) with acetic anhydride and ethyl acetate. The reduction of the 5-substituted, 3-pyridineacrylic acid may be carried out by catalytical hydrogenation or by the use of various reducing agents, such as a mixture of red phosphorus and hydroiodic acid. The preferred method is condensation of malonic acid with 5-substituted 3-pyridinecarboxaldehyde and reduction of the acrylic acid.

Compounds of Formula 6, wherein $R^1$ is fluoro or chloro and n is 0, may also be prepared by reacting a compound of the formula

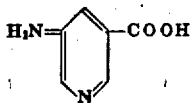

with sodium nitrite and (1) cupric chloride in hydrochloric acid solution, preferably in the presence of small amounts of cuprous chloride or (2) fluoboric acid in an aqueous solution and heating the fluoborate salt thus formed to the formation of a compound of the formula

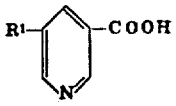

wherein $R^1$ is a fluorine or chlorine atom.

Preferably the reaction of the aminonicotinic acid is carried out in a cooled water solution also containing tetrahydrofuran.

(b) Compounds of the formula

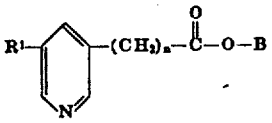

wherein $R^1$ has the meaning specified in (a); particularly $R^1$ may be hydrogen or, provided n is 0, a hydrogen or a fluorine atom, n is an integer from 0 to 3 inclusive, $R^1$ being hydrogen when n is 1, and B is a member of the class consisting of straight, branched, saturated and unsaturated alkyl groups containing at most 12 carbon atoms, cycloalkyl, phenylalkyl, alkyloxyalkyl, aryloxyalkyl, aminoalkyl, lower alkylaminoalkyl, dialkylaminoalkyl,

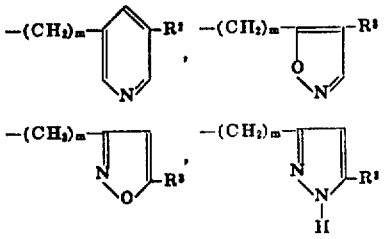

and

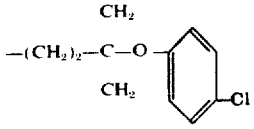

B not being ethyl when n is 0 and $R^1$ is H; wherein q is an integer from 0 to 4 inclusive, wherein m is an integer from 1 to 4 inclusive, $R^2$ is hydrogen, halogen or $—NH_2$ and $R^3$ is hydrogen, halogen, $—NH_2$ or an alkyl group which may be straight, branched, saturated or unsaturated, are prepared by reacting a compound of the formula

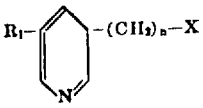

II with a compound of the formula

Y—B

III wherein $R^1$, n and B have the meaning specified above, Y is halogen or a hydroxy group and X is carboxyl, a metal carboxylate group or an activated carboxyl group, in which case the compound of Formula II is an acid chloride, an alkyl ester, an acid anhydride or a mixed anhydride with alkoxy formic acids, carboxylic acids, sulphonic or inorganic acids or derivatives obtained by a reaction between a carboxylic acid and a carbodiimide or similarly functioning compounds such as N,N¹-carbonyldiimidazole or N-ethyl-5-phenylisoxazolium-3¹-sulphonate, X being a metal carboxylate group when Y is halogen, whereafter the compound of Formula I thus obtained if necessary is transformed into a therapeutically acceptable salt by reaction with the appropriate acid.

The reaction may be performed in the presence of aqueous or anhydrous organic solvents such as chloroform, diethyl ether, tetrahydrofuran, benzene and toluene, or without solvents. Particularly when X represents a carboxyl group and Y is a hydroxy group there may be used an acid catalyst such as sulphuric acid, hydrogen chloride, p-toluene sulphonic acid, benzene sulphonic acid or salts with high to intermediate acid strength, even including ion exchangers saturated with hydrogen ions. In this case, in order to get a more favourable equilibrium, the water formed during the reaction may be removed from the reaction mixture by azeotropic distillation or taken up by drying agents such as anhydrous cupric or manganese sulphate and molecular sieves. When the compound of Formula II is an acid halide, the hydrogen halide liberated may be neutralized and the reaction catalyzed by a base such as pyridine and triethylamine.

(c) Compounds of the formula

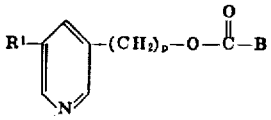

IV are prepared by reacting a compound of the formula

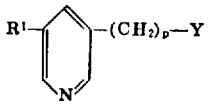

V with a compound of the formula

X—B

VI wherein p is an integer from 1 to 4 inclusive, $R^1$, B, X and Y have the meaning specified in (b), B including ethyl; $R^1$ being hydrogen when p is 2; particularly $R^1$ may be a fluorine or a chlorine atom. The reaction conditions are the same as in (b). The compounds of Formula IV thus obtained are transformed, if necessary, into a therapeutically acceptable salt by reaction with the appropriate acid.

(d) Diesters of pyridine, of the general formulas

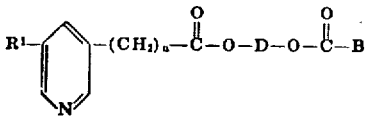

VII and

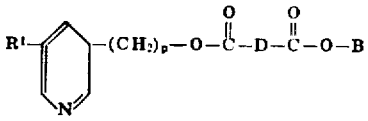

VIII wherein n, p, $R^1$, D and B have the meaning specified above; B excluding hydrogen, $R^1$ being hydrogen when n is 1 or when p is 2, are prepared by reacting

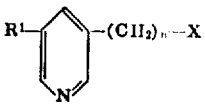

respectively

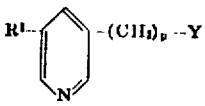

with compounds of the formulas

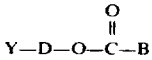

respectively

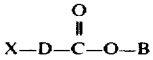

or by reacting compounds of the formula

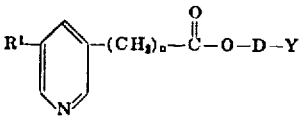

respectively

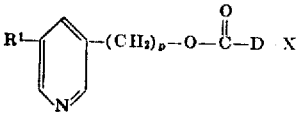

with compounds of the formula

X—B respectively

Y—B wherein X and Y have the meaning specified in (b). The reaction conditions are the same as in (b). If B is an aminoalkyl or an alkylaminoalkyl group the yield may be increased by protection of the amino group.

In case the compounds of Formulas VII and VIII are

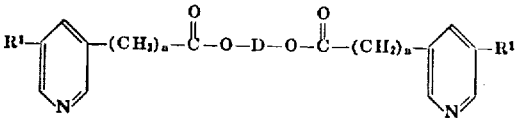

respectively

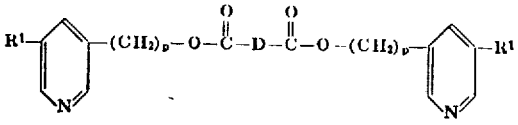

they can be prepared by reacting compounds of the formulas

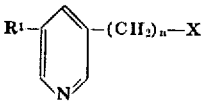

respectively

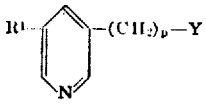

with compounds of the formulas

Y—D—Y respectively

X—D—X wherein X and Y have the meaning specified above. The reaction conditions are the same as in (b).

(e) Compounds of the formula

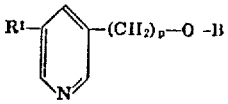

IX are prepared by reacting a compound of the formula

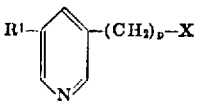

with a compound of the formula

Y—B wherein p is an integer from 1 to 4 inclusive, $R^1$ and B have the meaning specified above; B excluding hydrogen, $R^1$ being hydrogen when p is 2; particularly $R^1$ may be a hydrogen, fluorine or chlorine atom; X and Y are selected from the group consisting of hydroxyl, metal oxido groups and halogen; X being different from Y when X and Y are selected from the group consisting of halogen and metal oxido groups.

When both X and Y are hydroxyl groups a dehydrating reagent such as sulfuric acid or alumina at higher temperatures may be used. Where Y is a halogen atom and X is a metal oxido group the reaction is preferably carried out in a solvent such as ether, tetrahydrofurane and benzene or the alcohol corresponding to the metal alcoholate. In the latter case the metal alcoholate in the alcohol solvent could be obtained by dissolving a suitable amount of metal, such as sodium, in the excess of alcohol.

The compound of Formula IX thus obtained is transformed, if necessary, into a therapeutically acceptable salt by reaction with the appropriate acid.

Ethers of the formula

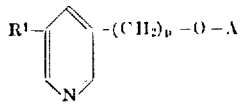

X wherein p and $R^1$ have the meaning specified above, $R^1$ being hydrogen when p is 2, and A is an alkyl group or pyranyl, may be prepared by adding in known manner an alcohol of the formula

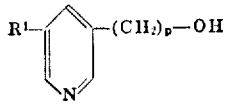

to the carbon-carbon double bond in an alken or in dihydropyran, preferably in the presence of an acid such as sulfuric acid.

When the alcohol is reacted with dihydropyrane the reaction may be carried out without or in the presence of solvents such as ether, tetrahydrofurane, benzene or an excess of dihydropyrane, preferably in the presence of acidic catalysts such as mineral acids, p-toluenesulphonic acid, benrenesulphonic acid or ion exchangers saturated with hydrogen ions.

(f) To prepare compounds of the formula

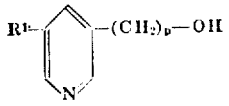

XI wherein p is an integer from 1 to 4 inclusive; particularly p may be 1; and $R^1$ is hydrogen, halogen or $—NH_2$, $R^1$ being hydrogen when p is 2, particularly $R^1$ may be a fluorine, chlorine or bromine atom; a compound of the general formula

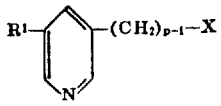

XII or a salt thereof, wherein $R^1$ and p have the meaning specified above, particularly, $R^1$ may be a fluorine, chlorine or bromine atom, and X is a formyl, carboxyl, chlorocarbonyl, alkoxycarbonyl, thiolester

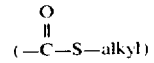

or a cyano group is reduced by methods, known to be applicable to the reduction of the unsubstituted analogues, for example catalytical hydrogenation and reduction by means of a complex metal hydride, to the formation of a compound of the general formula

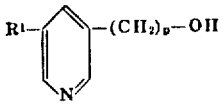

XI and, where a therapeutically acceptable salt is required, reacting the compound of Formula XI with the appropriate acid.

According to a preferred embodiment, a compound of the Formula XII, wherein p=1, $R^1$ is fluorine, chlorine or bromine, particularly $R^1$ is fluorine, and X is an alkoxy carbonyl group of at most 5 carbon atoms, is reduced by means of complex metal hydrides, such as sodium or potassium borohydride and lithium aluminum hydride. In cases when potassium or sodium borohydride is used as the reducing agent, the reaction may be performed in such solvents as methanol, ethanol, water or mixtures thereof. When lithium aluminum hydride is used as the reducing agent, the reaction is preferably performed in inert solvents such as diethyl ether and tetrahydrofuran.

Compounds of Formula XI may also be prepared by treating an amine of the formula

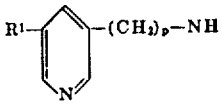

with a nitrite such as sodium nitrite in a water solution under such conditions that the intermediate diazonium compound decomposes and reacts with water to form an alcohol.

(g) Compounds of the formula

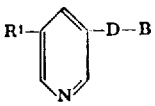

wherein $R^1$ is hydrogen, halogen or $—NH_2$, D is a straight, branched, saturated or unsaturated alkylene group containing at most 6 carbon atoms, and B is a member of the class consisting of hydrogen, straight, branched, saturated and unsaturated alkyl groups; the group—D—B containing at most 12 carbon atoms when B is alkyl; cycloalkyl, phenylalkyl, alkyloxyalkyl, aryloxyalkyl, aminoalkyl, lower alkylaminoalkyl, dialkylaminoalkyl,

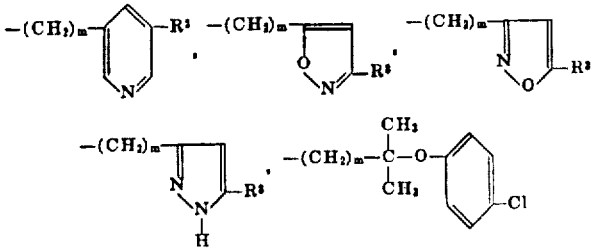

wherein $R^2$ and $R^3$ have the meaning specified above, and m is an integer from 0 to 4 inclusive may be prepared by reacting a compound of the formula

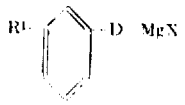

wherein $R^1$ and D have the meaning specified above and X is halogen, with a compound containing a carbonyl group, and reducing, by methods known to be applicable to analogous compounds, the alcohol obtained. If the hydroxyl group is not in a position to a pyridine ring, the reduction is carried out after replacing the hydroxyl group with a halogen atom, such as chlorine, in known manner.

Compounds of the formula

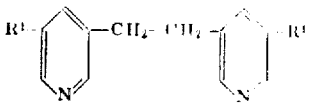

wherein $R^1$ is hydrogen or halogen, are prepared by condensation of two pyridinealdehydes, analogous to the benzoin condensation, and complete reduction of the product.

Compounds of the formula

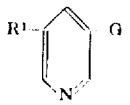

wherein $R^1$ is hydrogen, halogen or $—NH_2$ and G is an alkyl group, may be prepared by reduction of the corresponding halide, or reduction of the alcohol in cases where G is a hydroxymethyl group.

(h) Compounds of the formula

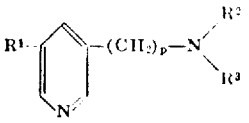

XIV wherein $R^1$ is halogen or $—NH_2$ and p is an integer from 1 to 4 inclusive, $R^2$ and $R^3$ are hydrogen or alkyl groups which may be straight, branched, saturated or unsaturated, may be prepared by reduction of a compound of the formula

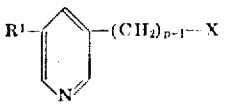

wherein p and $R^1$ have the meaning specified above and X is

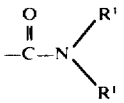

—CHO or —CN. The reduction is carried out by catalytical hydrogenation in the presence of an amine of the formula

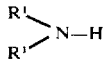

when X is —CHO; $R^2$ and $R^3$ are hydrogen when X is —CN. The reduction may be carried out by means of catalytical hydrogenation or by using a complex metal hydride such as lithium aluminum hydride, when X is not —CHO.

Compounds of Formula XIV wherein $R^2$ and $R^3$ are hydrogen may also be prepared by reduction of the compound

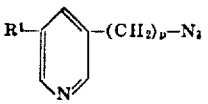

When a cyano or azido group is reduced, the reduction may be carried out by hydrogenation in the presence of catalysts such as rhodium, palladium, platina or Raney-nickel, preferably in the presence of hydrochloric acid or ammonia in suitable solvents such as dry or aqueous methanol and ethanol.

When X is $—CO—NR^2R^3$ the reduction is preferably carried out by means of lithium aluminum hydride in inert solvents such as diethyl ether or tetahydrofuran.

Compounds of Formula XIV wherein $R^2$ and $R^3$ are hydrogen may also be prepared by reduction of the corresponding oxime or hydrazone. The oxime may be reduced by zinc and acetic acid. The reduction may also be carried out by means of catalytical hydrogenation. Primary amines may also be prepared by reacting the corresponding amide with NaOX, wherein X is a chlorine or bromine atom (Hofmann rearrangement); by reacting the corresponding carboxylic acid with $HN_3$ according to Schmidt; and by rearrangement of a compound of the formula

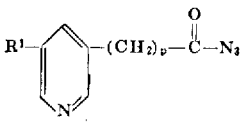

according to Curtius.

Further methods for the preparation of compounds of Formula XIV wherein $R^2$ and $R^3$ are hydrogen are hydrolysis or preferably hydrazinolysis of a corresponding imide such as phthalimide. The hydrolysis may be carried out in the presence of acids or bases and the hydrazinolysis carried out in the presence of hydrazine.

Compounds of Formula XIV may be prepared by reacting a compound of the formula

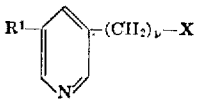

with an amine of the formula

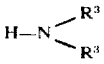

wherein p, $R^1$, $R^2$ and $R^3$ have the meaning specified above.

If necessary, the compounds of Formula XIV are transformed into therapeutically acceptable salts by reaction with the appropriate acid.

(i) Compounds of the formula

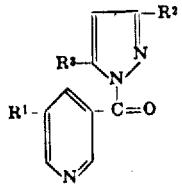

wherein $R^1$ is hydrogen, halogen or $—NH_2$, $R^2$ and $R^3$ are straight, branched saturated or unsaturated alkyl groups, hydroxyalkyl or carboxylakyl, are prepared by reacting a compound of formula

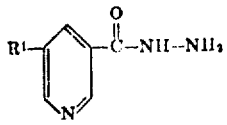

with a compound of the formula

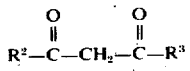

wherein $R^1$, $R^2$ and $R^3$ have the meaning specified above. The reaction is preferably carried out in the presence of solvents such as ethanol or isopropanol, and as a catalyst an acid such as hydrochloric acid may be used.

Another method to prepare compounds of Formula XV is to react a compound of the formula

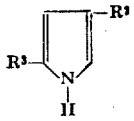

with a compound of the formula

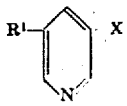

wherein $R^1$, $R^2$ and $R^3$ have the meaning specified above and X is a member of the class consisting of activated carboxyl groups such as an acid halide, an alkyl ester, an acid anhydride, a mixed anhydride with formic esters or carboxylic acids, sulphonic or inorganic acids or derivatives obtained by a reaction between a carboxylic acid and a carbodiimide or similarly functioning compounds such as N,N¹-carbonyl-diimidazole or N-ethyl-5-phenylisoxazolium-3′-sulphonate.

(j) Compounds of the general formula

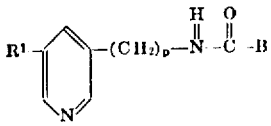

XVII wherein n, $R^1$ and B have the meanings specified in (b), B including ethyl; m being an integer from 0 to 4 inclusive, and p is an integer from 1 to 4 inclusive, $R^1$ being hydrogen when p is 2, are prepared by reacting a compound of the formula

B—X with a compound of the formula

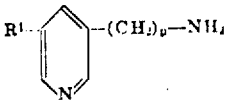

in which formulas $R^1$, B and p have the meaning specified above and X is an activated carboxyl group such as an acid halide, an alkyl ester, an acid anhydride, a mixed anhydride with alkoxy formic acids or carboxylic acids, sulphonic or inorganic acids, or derivates obtained by a reaction between a carboxylic acid and a carbodiimide or similarly functioning compounds such as N,N¹-carbonyl-diimidazole or N-ethyl-5-phenylisoxazolium-3′-sulphonate. The compound of Formula XVII thus obtained is tranformed, if necessary, into a therapeutically acceptable salt by reaction with the appropriate acid.

Compounds of the formula

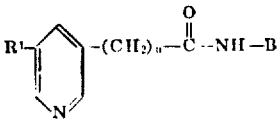

are prepared in a similar way by reacting a compound of the formula

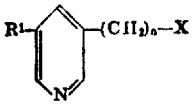

with a compound of the formula $H_2N—B$ wherein n, $R^1$, B and X have the meaning specified in (j) m excluding 0.

(k) Compounds of the formula

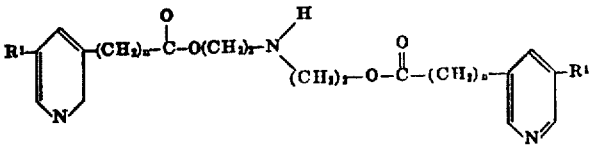

and

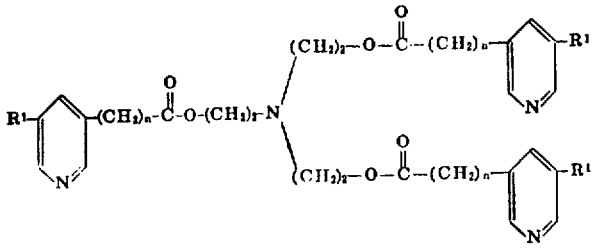

wherein n and $R^1$ have the meaning specified in (b); $R^1$ being hydrogen when n is 1, are prepared by reacting compounds of the formula

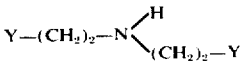

respectively

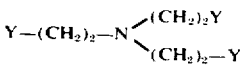

with a compound of the formula

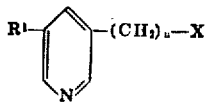

wherein X and Y have the meaning specified in (b). The hydrogen atom bound to nitrogen in diethanolamine may advantageously be protected during the reaction to increase the yield. The reaction conditions are the same as in (b).

(l) Compounds of the formula

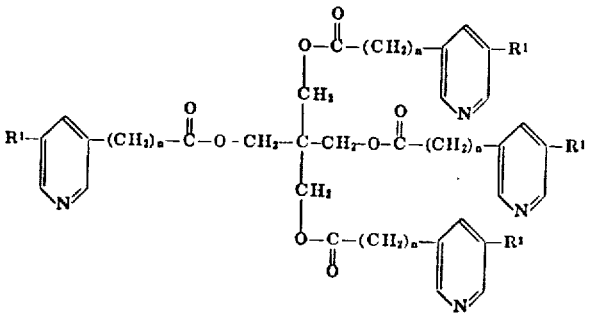

wherein n and $R^1$ have the meaning specified in (b), $R^1$ being hydrogen when n is 1, are prepared by reacting

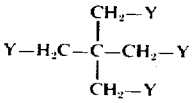

with

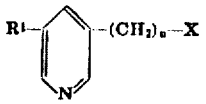

wherein X and Y have the meaning specified in (b). The reaction conditions are the same as in (b).

(m) Compounds of the formula

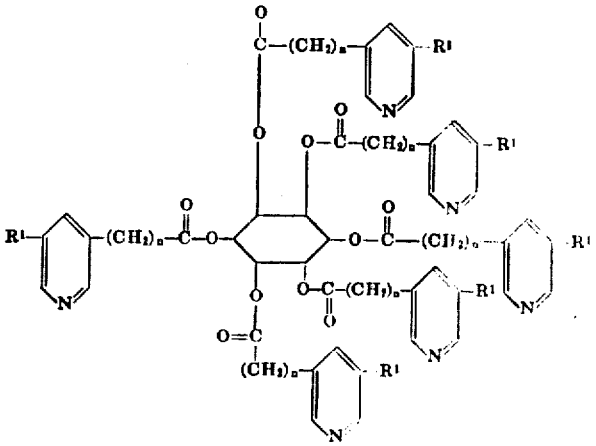

wherein $R^1$ and n have the meaning specified in (b), are prepared by reacting meso-inositol or a stereoisomer thereof with

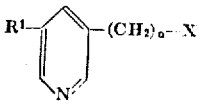

in which Formula X has the meaning specified in (j).

The following examples illustrate the invention:

EXAMPLE 1

Preparation of 5-fluoronicotinic acid

A mixture of 5-aminonicotinic acid (108 g.) in 700 ml. of fluoboric acid (48–50% w./w.), 530 ml. of tetrahydrofuran and 350 ml. of water was cooled in an ice-salt bath and with stirring sodium nitrite (71 g.) in a saturated water solution was added at such a rate that the temperature was lower than 3° C. 350 ml. of tetrahydrofuran was added and the mixture stirred for one hour at −5° C.–10° C. The precipitate formed was filtered off and thoroughly washed with cold ethanol, cold ether and petroleum ether until it was nearly colourless. This fluoborate salt was transferred to a large flask fitted with a stirrer and two reflux condensers and with about 500 ml. of dry ligroin (B.P. about 100° C.) and the flask was gently heated with an open flame at one point. An exothermic reaction started which soon spread to the whole mass of the salt. The decomposition was completed by refluxing for 30 minutes. The ligroin phase was recanted and the yellow product washed with ether. The product was dissolved in dilute aqueous sodium bicarbonate and reprecipitated with dilute aqueous hydrochloric acid. The precipitate was washed with water and dried to give 67 g. of weekly yellow product. This product may be purified by recrystallization, treatment with active carbon and a final sublimation to give a colourless product, M.P. 194° C. its identity was also established by IR-spectroscopy.

EXAMPLE 2

Preparation of 5-chloronicotinic acid 5-aminonicotinic acid (93 g.) was dissolved in a hot solution of 370 ml. of concentrated hydrochloric acid in 100 ml. of water. The solution was cooled to +5° C. and the resulting suspension stirred while a solution of sodium nitrite (52 g.) in 70 ml. of water was added over a period of one hour and at a temperature not exceeding +8° C. The mixture was stirred 15 minutes and then 450 ml. of a 10% (w./w.) aqueous solution of hydrochloric acid was added. The cold mixture was added during 30 minutes to a stirred solution of cupric chloride (140 g.) and cuprous chloride (0.69 g.) in 1850 ml. of 10% (w./w.) aqueous hydrochloric acid kept at 60° C. The mixture was stirred for 10 minutes and then cooled to 10° C. At this temperature sodium sulfide (with 9 molecules of crystal water, 231 g.) was added. The precipitate was filtered off and the filtrate treated with concentrated aqueous ammonium hydroxide (to pH 2.5–3) in order to precipitate the product. The crude product was filtered off and immediately dissolved in 3 l. of water. The solution was treated with active carbon, filtered and the product allowed to crystallize. It was obtained 60 g. product with M.P. 165–6° C. A further recrystallization raised the melting point to 167–168° C.

EXAMPLE 3

Preparation of tablets containing 5-fluoronicotinic acid 100 g. of 5-fluoronicotinic acid were mixed with 50 g. of lactose and 45 g. of potato starch and moistened with a starch paste prepared from 5 g. of potato starch and distilled water, whereafter the mixture was granulated through a sieve. The granulate was dried and sieved whereafter 2 g. of magnesium stearate were mixed in. Finally the mixture was pressed into tablets, each weighing 202 mg.

EXAMPLE 4

Pyrazole-3-methyl 5-fluoronicotinate

To a stirred and refluxed mixture of 3-pyrazolmethanol (2.95 g.), 5-fluoronicotinic acid chloride hydrochloride (4/3 equivalents) and 8 ml. of 30% w./w. hydrochlorine-diethylether in 100 ml. of anhydrous tetrahydrofuran, 30 ml. of triethylamine was added during 1.75 hours. The stirred mixture was further refluxed during 4.5 hours and then the precipitated hydrochloride was filtered off and washed with 300 ml. of diethyl ether. The filtrate was washed with 3 portions of an aqueous saturated solution of sodium bicarbonate followed by one portion of water and dried over anhydrous sodium sulphate. Filtering and evaporation of the solvent gave 6.8 g. of oil, which crystallized upon cooling. After repeated recrystallization from isopropyl ether the product melted at 88.0–91.5° C. The structure was confirmed by IR- and NMR-spectroscopy.

In an analogous way the following ester was also prepared 5-methylpyrazole-3-methyl 5-fluoronicotinate, yield 70% M.P. 77° C. The structure was confirmed by IR- and NMR-spectroscopy.

EXAMPLE 5

5-fluoronicotinic acid ethylester 5-fluoronicotinic acid (43.6 g.) was refluxed for 4 hours with 550 ml. of thionyl chloride. Excess thionyl chloride was evaporated. To the acid chloride hydrochloride thus obtained 420 ml. of absolute ethanol were slowly added at room temperature. The mixture, which soon became homogenous, was refluxed for 2.5 hours. Excess ethano was evaporated and the solid residue was treated with excess of saturated sodium hydrogen carbonate solution to liberate the basic form of the product. The mixture obtained was extracted three times with ether and the ether solution dried over sodium sulphate. Evaporation of solvent and distillation of the residue in vacuo gave 40.9 g. of nearly colourless liquid, B.P. 92–94° C. at 13 mm. Hg, $n_D^{25}$=1.4820.

Analysis.—Equivalent weight —Found: 172. Calculated for $C_8H_8FNO_2$: 169.

EXAMPLE 6

5-fluoronicotinic acid n-hexyl ester 5-fluoronicotinic acid (4.0 g.) was dissolved by heating in a mixture of 6.0 ml. of sulfuric acid (95% w./w.) and 75 ml. of redistilled 1-hexanol and the solution was alllowed to stand at 120° C. for 3.5 hours. The main part of the excess of 1-hexanol was driven off in vacuo at 80° C. and the residue was poured on about 200 ml. of icewater. The mixture was made slightly alkaline with concentrated ammonia solution and extracted with 4 portions of ether. The ether solution was dried over anhydrous sodium sulphate. The residue after evaporation was distilled at 13 mm. Hg and gave 2.9 g. of colourless liquid, B.P. 146–147° C., $n_D^{25}$=1.4730.

Analysis.—Found (percent): C, 63.98; H, 7.22; F, 8.62; N, 6.18. Calculated for $C_{12}H_{16}FNO_2$ (percent): C, 63.98;H, 7.16;F, 8.43;N, 6.22.

EXAMPLE 7

5-chloronicotinic acid ethyl ester 5-chloronicotinic acid (121.5 g.) was refluxed for 4 hours with 1.400 ml. of thionyl chloride. A homogenous solution was obtained after 2.5 hours. Excess thionyl chloride was evaporated and to the acid chloride hydrochloride thus obtained 1.100 ml. of absolute ethanol were slowly added at room temperature. The mixture was refluxed for 3 hours and excess ethanol was then driven off in vacuo. The solid residue was treated with excess sodium hydrogen carbonate solution to liberate the basic form of the product. The mixture obtained was extracted with ether and the ether solution dried over anhydrous sodium sulphate. Evaporation of the solvent and distillation of the residue in vacuo gave 126.1 g. of nearly colourless liquid, B.P. 121–123° C. at 14 mm. Hg. $n_D^{25}$=1.5175.

Analysis.—Found (percent); Cl, 18.9. Calculated for $C_8H_8ClNO_2$ (percent): Cl, 19.1.

EXAMPLE 8

5-fluoronicotinic acid methyl ester 5-fluoronicotinic acid (6.00 g.) was disolved in a mixture of 10 ml. of concentrated sulfuric acid and 100 ml. of anhydrous methanol and the solution obtained was refluxed for 5 hours. Excess methanol was evaporated in vacuo and the residue poured on about 150 ml. of icewater. The mixture was made alkaline with solid sodium hydrogen carbonate and extracted with 4 portions of 50 ml. of ether. The ether solution was dried over anhydrous sodium sulphate, filtered and evaporated. The crystalline colourless residue weighed 5.75 g. and melted at 49.5–50.5° C. Recrystallization from petroleum ether gave 4.85 g. of colourless crystals melting at 50.0–50.5° C.

Equivalent weight—Found: 158.7. Calculated for $C_7H_6FNO_2$: 155.1.

EXAMPLE 9

5-fluoronicotinic acid allylester

A solution of 5-fluoronicotinic acidchloride in pyridine-chloroform was prepared in the following way. 5-fluoronicotinic acid (33.0 g.) was refluxed with thionyl chloride (130 ml.) for 4 hours. The excess of thionyl chloride was evaporated under reduced pressure and then anhydrous chloroform (110 ml.) followed by anhydrous pyridine (45 ml.) was added. The mixture was heated at 90° C. for a few minutes and then cooled in an ice-bath. To this solution (42 ml. out of a total volume of 184 ml.) a solution of freshly distilled allyl alcohol (2.9 g.) in anhydrous chloroform (20 ml.) was added with stirring during 15 minutes. The reaction mixture was allowed to stand 20 hours at room temperature and was then added to a small amount of water. The chloroform layer was separated, washed twice with a saturated sodium bicarbonate solution and once with water, and then dried over anhydrous sodium sulfate. Evaporation of the chloroform gave 7.5 g. yellow oil, which was purified by distillation in vacuo to give 5.6 g. colourless liquid. B.P. 99–101° C./12 mm., $n_D^{25}$=1.4953.

Analysis.—Found (percent): C, 59.47; H, 4,52; F, 10.71; N, 7.92. Calculated for $C_9H_8FNO_2$ (percent): C, 59.67; H, 4.45; F, 10.49; N, 7.73.

By the same procedure and using the same solution of 5-fluoronicotinic acidchloride, the following esters were prepared: 5-fluoronicotinic acid butylester, yield 60%, B.P. 113–114° C./12 mm., $n_D^{25}$=1.4764.

Equivalent weight—Found: 200. Calculated: 197.

5-fluoronicotinic acid iso-propylester, yield 60%, B.P. 90–91° C./12 mm., $n_D^{25}$=1,4734.

Analysis.—Found: C, 58.78; H, 5.33; F, 10.24; N, 7.81. Calculated for $C_9H_{10}FNO_2$ (percent): C, 59.01; H, 5.50; F, 10.37; N, 7.65.

5-fluoronicotinic acid 1-undecylester, yield 60%, B.P. 153–155° C./0.1 mm. Hg. $n_D^{25}$=1.4711.

Analysis.—Found: C, 69.20; H, 8.41; F, 6.30; N, 4.93. Calculated for $C_{17}H_{26}FNO_2$ (percent): C, 69.15; H, 8.87; F, 6.43; N, 4.74.

By the same procedure but using a benzene solution of 5-fluoronicotinic acidchloride, the following ester was also prepared:

5-fluoronicotinic acid cyclohexylester, yield 60%, B.P. 104–106° C./1.0–1.3 mm., $n_D^{25}$=1.5017.

Analysis.—Found (percent): C, 64.70; H, 6.47; F, 8.57; N, 6.19. Calculated for $C_{12}H_{14}FNO_2$ (percent): C, 64.56; H, 6.32; F, 8.51; N, 6.28.

EXAMPLE 10

5-fluoro-3-pyridinemethyl 5-fluoronicotinate 5-fluoronicotinic acid (5.94 g.) was refluxed 4.5 hours with 24 ml. of thionyl chloride. Excess thionyl chloride was evaporated and the residue heated for 10 minutes at 80° C. with a mixture of chloroform (20 ml.) and pyridine (8 ml.). The solution was cooled in an ice-bath and a solution of 5-fluoro-3-pyridinemethanol (5.10 g.) in 15 ml. of chloroform was added with stirring during 30 minutes. The reaction mixture was stirred at room temperature for 2 hours and was then allowed to stand overnight. The mixture was poured out on ice-water and the chloroform phase separated and washed twice with a saturated aqueous solution of sodium hydrogen carbonate. The chloroform solution was dried over anhydrous sodium sulfate, filtered and the solvent evaporated to give 9.0 g. of nearly colourless product. M.P. 105.5–106.0° C.

Analysis.—Found (percent): C, 57.84; H, 3.35; F, 15.41; N, 11.11. Calculated for $C_{12}H_8F_2N_2O_2$ (percent): C, 57,60; H, 3.22; F, 15.19; N, 11.20.

The following compounds were prepared in an analogous way:

5-chloro-3-pyridinemethyl nicotinate

Yield 78%. M.P. 68.5–69.5° C. (from diisopropyl ether).

Analysis.—Found (percent): C, 58.3; H, 3.45; Na 11.1; O, 13.15; Cl, 14.0. Calculated for $C_{12}H_9N_2O_2Cl$ (percent): C, 57.95; H, 3.65; N, 11.26; O, 12.86; Cl, 14.25.

3-pyridinemethyl 5-fluoronicotinate

Yield 75%. M.P. 56.6–57.0° C. (prisms) and 62.0–63.0° C. (needles).

Analysis.—Found (percent): C, 62.21; H, 4.02; F, 8.35; N, 12.03. Calculated for $C_{12}H_9N_2O_2$ (percent): C, 62.07; H, 3.91; F, 8.18; N, 12.07.

EXAMPLE 11

5-fluoro-3-pyridinemethyl 5-fluoronicotinate

To a stirred suspension of 5-fluoronicotinic acid (7.05 g.) and 5-fluoro-3-pyridinemethanol (6.35 g.) in 70 ml. of anhydrous dioxane, a solution of N,N-dicyclohexylcarbodiimide (10.3 g.) in 50 ml. of anhydrous dioxane was added during one hour with ice-cooling. The reaction mixture was stirred at room-temperature during 16 hours and was then poured on a small amount of cold ethyl acetate. The urea precipitated was filtered off and the filtrate evaporated. The yellow semi-solid residue was dissolved in a small amount of chloroform, put on a short column of aluminum oxide and eluted with 200 ml. of chloroform. The residue after evaporation of the chloroform solution was recrystallized from petroleum ether with a little ethanol added. The product, 4.2 g., M.P. 105–106° C., was identical with the one prepared according to Example 10.

3-pyridinemethyl 5-chloronicotinate was prepared in an analogous way. Yield 35%. M.P. 90–91° C.

Analysis.—Found (percent): C, 58.1; H, 3.39; N, 11.7; O, 12.8; Cl, 14.4. Calculated for $C_{12}H_9N_2O_2Cl$ (percent): C, 57.95; H, 3.65; N, 11.26; O, 12.86; Cl, 14.25.

EXAMPLE 12

5-fluoro-3-pyridinemethyl nicotinate

Nicotinic acid (3.7 g.) was refluxed 1 hour with thionyl chloride (11.9 g.). Evaporation of excess thionyl chloride gave 4.95 g. of crude nicotinic acid chloride hydrochloride, which was covered with 10 ml. of anhydrous benzene. To this mixture a solution of 5-fluoro-3-pyridinemethanol in a mixture of 12 ml. of triethylamine and 40 ml. of benzene was added with stirring. The resulting mixture was refluxed for 5 hours. After cooling the triethylamine hydrochloride was filtered off and washed with benzene. The combined washings and the filtrate were evaporated in vacuo to give a semi-solid residue. The crude product was recrystallized from petroleum ether to give 3.5 g. of crystals with M.P. 65–67.5° C. Repeated recrystallizations from petroleum ether gave a completely colourless product with M.P. 68.5–69.5° C.

Analysis.—Calculated for $C_{12}H_9FN_2O_2$ (percent): C, 62.07; H, 3.91; F, 8.18; N, 12.07; O, 13.78. Found (percent): C, 62.03; H, 3.87; F, 8.05; N, 12.14.

EXAMPLE 13

3-pyridineethyl 3-pyridineacetate

A mixture of 3-pyridineacetic acid (10.4 g.), 3-pyridinemethanol (9.3 g.) and concentrated sulfuric acid (10 ml.) in 200 ml. of benzene was refluxed during 6 hours. The reaction water formed was continually taken away by azeotropic distillation. The benzene phase was decanted and the oily residue dissolved in 50 ml. of cold water and the solution made alkaline with aqueous sodium carbonate. The alkaline mixture was extracted several times with diethyl ether, the extract dried over anhydrous potassium carbonate, filtered and the solvent evaporated to give 9.1 g. product. Distillation in vacuo gives 7.3 g. product, B.P. 162–162.5° C./0.3 mm. Hg; $n_D^{25}$=1.5540; hydrochloride M.P. 126–127° C.

Analysis (hydrochloride).—Found (percent): C, 52.8; H, 5.26; N, 8.76; O, 9.96; Cl, 22.65. Calculated for $C_{14}H_{16}N_2O_2Cl_2$ (percent): C, 53.34; H, 5.12; N, 8.89; O, 10.15; Cl, 22.49.

In an analogous way the following compounds were prepared:

3-pyridinemethyl 3-pyridineacetate

Reflux period 5 hours. Yield 40%. M.P. 53–54° C.

Analysis.—Found (percent): C, 68.1; H, 5.29; N, 12.3; O, 14.2. Calculated for $C_{13}H_{12}N_2O_2$ (percent): C, 68.41; H, 5.30; N, 12.27; O, 14.02.

5-fluoro-3-pyridinemethyl 3-pyridinebutyrate

Reflux periods 70 hours with p-toluenesulfonic acid instead of sulfuric acid. Yield 60%. $n_D^{25}$=1.535.

Analysis.—Found (percent): C, 65.55; H, 5.49; F, 6.80; N, 10.40. Calculated for $C_{15}H_{15}FN_2O_2$ (percent): C, 65.68; H, 5.51; F, 6.93; N, 10.21.

5-fluoro-3-pyridinemethyl 3-pyridineacetate

Reflux period 20 hours with p-toluenesulfonic acid instead of sulfuric acid. Yield 60%. M.P. 58.0–60.0° C.

Analysis.—Found (percent): C, 63.33; H, 4.77; F, 7.55; N, 11.53. Calculated for $C_{13}H_{11}FN_2O_2$ (percent): C, 63.41; H, 4.50; F, 7.72; N, 11.38.

EXAMPLE 14

5-chloro-3-pyridinemethyl 3-pyridineacetate

To a stirred mixture of 3-pyridineacetic acid (5.50 g.) and 5-chloro-3-pyridinemethanol (6.05 g.) in 190 ml. of anhydrous diethyl ether a solution of N,N'-cyclohexylcarbodiimide in 50 ml. of anhydrous diethylether was added at 10° C. during 10 minutes. The mixture was stirred at room temperature during 2.5 hours and then urea formed was filtered off. The filtrate was evaporated to give 14.2 g. of product, which was transformed to its hydrochloride and crystallized from ethanol-ether. The pure hydrochloride had M.P. 165–167° C.

Analysis.—Found (percent): C, 45.8; H, 4.23; N, 8.28; O, 9.58; Cl, 32.3. Calculated for $C_{13}H_{13}N_2O_2Cl_3$ (percent): C, 46.52; H, 3.90; N, 8.35; O, 9.53; Cl, 31.69.

EXAMPLE 15

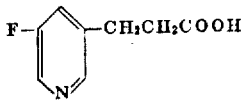

The starting material 5-fluoro-3-pyridineacrylic acid, (M.P. 234–235° C.) was prepared by condensation of malonic acid with 5-fluoro-3-pyridinecarboxaldehyde (prepared by lead tetraacetate oxidation of 5-fluoro-3-pyridinemethanol) followed by decarboxylation of the intermediate product.

5-fluoro-3-pyridineacrylic acid (26.5 g.) was refluxed for 17 hours with a mixture of red phosphor (8.6 g.), hydroiodic acid (density 1.70, 240 ml.) and acetic acid (120 ml.). The volatile part of the mixture was evaporated, the residue treated with water and the volatile part again evaporated. The residual oil was washed with ethanol and crystallized from water. Yield 22.3 g., M.P. 169–171° C.

Analysis.—Found (percent): C, 57.42; H, 5.11; N, 8.10. Calculated for $C_8H_8FNO_2$ (percent): C, 56.80; H, 4.76; N, 8.28.

EXAMPLE 16

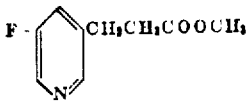

Diazomethane (0.05–0.06 mole) in 200 ml. of ether was slowly added at room temperature to a suspension of 5-fluoro-3-pyridine-propionic acid (5.1 g.) in 200 ml. of dry ether. After standing over night, the ether solution was filtered and the solvent evaporated to give 5 g. oil. The oil was distilled at 0.6 mm. Hg and 4.3 g. product with B.P. 75–78° C. and $n_D^{25}$=1.4862 was obtained.

Analysis.—Found (percent): C, 58.83; H, 5.61; N, 7.83. Calculated for $C_9H_{10}FNO_2$ (percent): C, 59.00; H, 5.50; N, 7.65.

EXAMPLE 17

Pyridine-3-methyl 5-methylpyrazole-3-carboxylate 5-methylpyrazole-3-carboxylic acid (5.05 g.) and 3-pyradinemethanol (4.36 g.) was refluxed together with p-toluenesulfonic acid monohydrate (19 g.) in 100 ml. of benzene. A water-separator was used in order to withdraw the water in the reaction mixture. After 27 hours the benzene phase of the reaction mixture was decanted and the residue treated with the excess aqueous sodium bicarbonate. The aqueous mixture was extracted with the decanted benzene phase and three portions of chloroform. The combined extracts were dried over anhydrous sodium sulfate, filtered and the solvent evaporated to give 4.9 g. of a yellow oil which spontaneously crystallized upon cooling. After recrystallization from benzene the product melted at 123.5–124.5° C.

Analysis.—Found (percent): C, 60.5; H, 5.12; N, 19.4; O, 14.9. Calculated for $C_{11}H_{11}N_3O_2$ (percent): C, 60.82; H, 5.11; N, 19.43; O, 14.73.

In an analogous way using toluene as solvent, the following esters were also prepared:

5-fluoropyridine-3-methyl 5-methylpyrazole-3-carboxylate, yield 75%, M.P. 141.5–143° C.

Analysis.—Found (percent): C, 55.96; H, 4.36; F, 7.96; N, 17.75. Calculated for $C_{11}H_{10}FN_3O_2$ (percent): C, 56.17; H, 4.29; F, 8.08; N, 17.86.

5-fluoropyridine-3-methyl pyrazole-3-carboxylate yield 75%, M.P. 162° C. Equivalent weight—Found: 219. Calculated: 221.

EXAMPLE 18

5-fluoro-3-pyridinemethyl acetate

To 50 ml. of stirred acetic anhydride, 5-fluoro-3-pyridinemethanol (10.2 g.) was added slowly at room temperature. The reaction solution was allowed to stand for 3 days and then excess acetic anhydride was driven off in vacuo. The residue was distilled in vacuo to give 9.3 g. of colourless product, B.P. 102–105°C./10 mm. Hg, $n_D^{25}$=1.4850.

Analysis.—Found (percent): C, 57.02; H, 4.87; F, 11.07; N, 8.45. Calculated for $C_8H_8FNO_2$ (percent): C, 56.80; H, 4.76; F, 11.23; N, 8.28.

EXAMPLE 19

5-fluoro-3-pyridinemethyl capyrylate

To a stirred solution of 5-fluoro-3-pyridinemethanol (3.8 g.) and 13 ml. of triethylamine in 100 ml. of anhydrous benzene, a solution of capyrylic acid chloride (4.9 g.) in 25 ml. of benzene was slowly added at room temperature. The mixture was stirred for 30 minutes at room temperature and then refluxed during 2 hours. After cooling the precipitate of amine hydrochloride was filtered off and washed with benzene. The combined washings and filtrate were evaporated in vacuo to give 8.3 g. of liquid residue. This was distilled in vacuo to give 5.1 g. of nearly colourless liquid, B.P. 145–150° C./0.05 mm. Hg; $n_D^{25}$=1.4730.

Analysis.—Found (percent): C, 66.25; H, 7.86; F, 7.33; N, 5.60. Calculated for $C_{14}H_{20}FNO_2$ (percent): C, 66.38; H, 7.96; F, 7.50; N, 5.53.

EXAMPLE 20

5-fluoro-3-pyridinemethyl pivalate

To a well stirred and ice-cooled solution of 5-fluoro-3-pyridinemethanol (6.35 g.) and 15 ml. of triethylamine in 100 ml. of dry benzene, a solution of pivaloyl chloride (6.0 g.) in 10 ml. of dry benzene was added during one hour. The reaction mixture was stirred 4.5 hours at room temperature and then filtered. The filtrate was washed twice with 50 ml. of a saturated aqueous solution of sodium hydrogen carbonate and then dried over anhydrous sodium sulfate. Filtering and evaporation of the solvent gave 8.7 g. of yellow-red oil, which was distilled in vacuo to give 5.45 of colourless product, B.P. 119–121.5° C./13 mm. Hg; $n_D^{25}$=1.470.

Analysis.—Found (percent): C, 62.50; H, 6.53; F, 8.91; N, 6.80. Calculated for $C_{11}H_{14}FNO_2$ (percent): C, 62.54; H, 6.68; F, 8.99; N, 6.63.

5-fluoro-3-pyridinemethyl vinylacetate was prepared in an analogous way. Yield 55%; B.P. 89–91° C./0.8 mm. Hg; $n_D^{25}$=1.497.

Analysis.—Found (percent): C, 61.05; H, 5.55; F, 9.63; N, 7.15. Calculated for $C_{10}H_{10}FNO_2$ (percent): C, 61.53; H, 5.16; F, 9.73; N, 7.18.

EXAMPLE 21

5-chloro-3-pyridinemethyl propionate 5-chloro-3-pyridinemethanol (7.2 g.) was mixed with 50 ml. of propionic anhydride (freshly distilled) and the reaction solution allowed to stand for 5 days at room temperature. Excess anhydride was driven off in vacuo and the residue distilled in vacuo to give 8.8 g. of product with B.P. 90–91° C./0.07 mm. Hg; $n_D^{25}$=1.513.

Analysis.—Found (percent): C, 54.26; H, 5,09; N, 7.06. Calculated for $C_9H_{12}NO_2Cl$ (percent): C, 54.14; H, 5.05; N, 7.02.

EXAMPLE 22

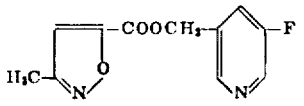

5-fluoro-3-pyridinemethyl 3-methyl-5-isoxazolecarboxylate 3-methyl-5-isoxazolecarboxylic acid (6.35 g.), 5-fluoro-3-pyridinemethanol (6.35 g.) was p-toluenesulfonic acid monohydrate (14.3 g.) was refluxed 47 hours in 100 ml. of toluene. The water in the reaction mixture was continuously removed by azeotropic distillation. The residue after evaporation of the solvent was treated with an excess of saturated aqueous solution of sodium hydrogencarbonate. The precipitate was filtered off and recrystallized from diisopropyl ether to give 4.75 g. weakly yellow product, M.P. 79–81° C., which could be raised to 80.0–81.5° C. by repeated recrystallization from diisopropylether.

Analysis.—Found (percent): C, 55.35; H, 3.80; F, 8.31; N, 11.90. Calculated for $C_{11}H_9FN_2O_3$ (percent): C, 55.93; H, 3.84; F, 8.04; N, 11.86.

In the same way 5-fluoro-3-pyridinemethyl 5-methyl-3-isoxazolecarboxylic acid was prepared; M.P. 69.0–71.5° C.

Analysis.—Found (percent): C, 56.03; H, 3.97; F, 7.79; N, 11.54. Calculated for $C_{11}H_9FN_2O_3$ (percent): C, 55.93; H, 3.84; F, 8.04; N, 11.86.

EXAMPLE 23

Diester of 5-fluoro nicotinic acid and ethylene glycol $R^1=R^2=F$, $D=-CH_2CH_2-$ 5-fluoronicotinic acid was refluxed for 3.5 hours with 60 ml. of thionyl chloride. Excess thionylchoride was distilled off in vacuo and the residue heated with a mixture of pyridine (25 ml.) and benzene (50 ml.) at 60–70° C. during one hour. The solution was cooled in an ice-bath and ethylene glycol (1.50 g.) was added with stirring. The mixture was allowed to stand for 24 hours at room temperature and was then poured out on 200 ml. of ice-water. The aqueous mixture was made alcoline with sodium hydrogen carbonate and extracted with four portions of diethyl ether. The extract was dried over anhydrous sodium sulphate, filtered and the solvent evaporated to give a crystalline residue, which was triturated with a little cold petroleum ether. Yield 6.21 g., M.P. 84–90° C. Recrystallization from diisopropyl ether gave 5.35 g. of colourless product with M.P. 91.0–91.5° C.

Analysis.—Found (percent:) C, 54.88; H, 3.39; F, 12.53; N, 9.05. Calculated for $C_{14}H_{10}F_2N_2O_4$ (percent): C, 54.55; H, 3.27; F, 12.33; N, 0.09.

In an analogous way the following compounds were prepared:

Diester of 5-fluoronicotinic acid and hexane-1,2-diol $R^1=R^2=F$; $D=-(CH_2)_6-$ Yield 80%; M.P. 56.0–56.5° C.

Analysis.—Found (percent): C, 59.75; H, 5.16; F, 11.07; N, 8.17. Calculated for $C_{18}H_{18}F_2N_2O_4$ (percent): C, 59.34; H, 4.98; F, 10.43; N, 7.69.

Diester of 5-fluoronicotinic acid and propane-1,2-diol $R^1=R^2=F$, $D^2=-CH_2\overset{CH_3}{\overset{|}{C}}H-$ Yield 50%; M.P. 192–194° C./0.3 mm. Hg: $n_D^{25}$=1.5200.

Analysis.—Found (percent): C, 55.66; H, 4,17; F, 11.24; N, 8.24. Calculated for $C_{16}H_{12}F_2N_2O_4$ (percent): C, 55.91; H, 3.75; F, 11.79; N, 8.69.

Diester of 5-fluoronicotinic acid and trans-2-butene-1,4 diol

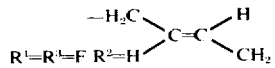

Yield 75%; M.P. 115.5–116.0° C.

Analysis.—Found (percent): C, 57.67; H, 3.70; F, 11.24; N, 8.24. Calculated for $C_{16}H_{12}F_2N_2O_4$ (percent): C, 57.49.

EXAMPLE 24

Diester of succinic acid and 5-fluoro-3-pyridine methanol $R^1=R^2=F$, $D=-CH_2CH_2-$ Succinic acid (2.36 g.), 5-fluoro-3-pyridine methanol (5.1 g.) and p-toluene sulfonic acid monohydrate (10.0 g.) were refluxed 23 hours in 50 ml. of benzene. The water in the reaction mixture was continuously removed by azeotropic distillation. The mixture was poured out on ice-water and made alkaline with sodium hydrogen carbonate. The precipitate formed was filtered off, washed with water and dried. It weighed 2.9 g., M.P. 80.0–81.0° C., after recrystallization from ether-ethanol, M.P. 80.0–81.5° C.

Analysis.—Found (percent): C, 57.30; H, 4.22; F, 11.33; N, 8.57. Calculated for $C_{16}H_{14}F_2N_2O_4$ (percent): C, 57.14; H, 4.20; F, 11.30; N, 8.33.

In an analogous way the following compounds were also prepared:

Diester of Adipic acid and 5-fluoro-3-pyridine methanol $R^1=R^2=F$, $D=(CH_2)_4$ Yield 65%, M.P. 57.0–57.5° C.

Analysis.—Found (percent): C, 59.59; H, 4.96; F, 10.59; N, 7.70. Calculated for $C_{18}H_{18}F_2N_2O_4$ (percent): C, 59.34; H, 4.98; F, 10.43; N, 7.69.

Diester of suberic acid and 5-fluoro-3-pyridine methanol $R^1=R^2=F$, $D=(CH_2)_6$ Yield 45%; M.P. 63.0–64.0° C.

Analysis.—Found (percent): C, 61.40; H, 5.60; F, 9.53; N, 7.09. Calculated for $C_{20}H_{22}F_2N_2O_4$ (percent): C, 61.22; H, 5.65; F, 9.68; N, 7.14.

Diester of fumaric acid and 5-fluoro-3-pyridine methanol

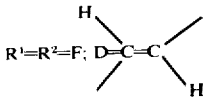

Yield 30%. M.P. 120.5–122° C.

Equivalent weight (titration as base)—Found: 167. Calculated for $C_{16}H_{12}F_2N_2O_4$: 167.2.

The identity and purity of the product was also established by NMR spectroscopy.

EXAMPLE 26

5-fluoro-3-pyridinemethanol

To a stirred solution of ethyl 5-fluoronicotinate (54.1 g.) in 270 ml. of methanol, potassium borohydride (53.9 g.) was added with cooling over a period of one hour. The mixture was stirred 30 minutes at room temperature and then refluxed for 6 hours. The solution was stirred over night at room temperature and then most of the solvent was evaporated. The residue was dissolved in 300 ml. of water and after one hour extracted with five 100 ml. portions of ether. The ether solution was dried over anhydrous sodium sulfate, filtered and the solvent evaporated to give 38 g. of a yellow oil. The oil was distilled in vacuo to give 29.6 g. colourless product, B.P. 83–85° C./0.05–0.01 mm. Hg. The hydrochloric melts (after repeated recrystallizations from ethanol) at 162° C.

Analysis.—Found (percent): C, 44.19; H, 4.59; N, 8.70; F, 11.42; Cl, 21.52. Calculated for $C_6H_7NOFCl$ (percent): C, 44.05; H, 4.32; N, 8.56; F, 11.61; Cl, 21.68.

EXAMPLE 27

5-fluoro-3-pyridinemethanol

To a stirred ice-cooled solution of lithium aluminum hydride (14.4 g.) in 530 ml. of anhydrous ether a precooled solution of ethyl 5-fluoronicotinate (64.3 g.) in 370 ml. of anhydrous ether was added during 1.5 hours at a reaction temperature not exceeding 6° C. The mixture was stirred with cooling 30 minutes and then 72 ml. of a sodium sulfate solution in water (5 ml./g.) was slowly added with stirring and cooling. The mixture was filtered and the solid material washed with ether. The combined ether solutions were dried, filtered and the solvent evaporated to give 36.6 g. red oil. This was converted to the hydrochloride, which after repeated recrystallizations from ethanol melts at 162° C. The product was shown to be identical with the one prepared according to Example 26.

EXAMPLE 28

5-chloro-3-pyridinemethanol

To a stirred ice-cooled solution of ethyl 5-chloronicotinate (50 g.) in 150 ml. of methanol, sodium borohydride (31 g.) was slowly added. The reaction mixture was stirred one hour at room temperature and then refluxed for 7 hours. After this time 500 ml. of ice-water was added and the mixture was acidified to pH=1—0.1 with hydrochloric acid and stirred for 15 minutes. The mixture was then made slightly alkaline (pH=8—9) with 30% sodium hydroxide solution and extracted with 4 portions of 100—150 ml. of ethyl acetate. The combined ethyl acetate extract was washed once with water and once with a sodium chloride solution, dried, and the solvent evaporated to give 32 g. oil. The product was purified with vacuum distillation to give 20 g. colourless liquid, B.P. 100–106/0.1 mm. Hg.

The hydrochloride melts at 138–142° C. Calculated (percent): Cl (as HCl), 19.7. Titration gave 19.5%. The compound was also characterized by its IR spectrum.

EXAMPLE 29

5-bromo-3-pyridinemethanol

To a stirred solution of lithium aluminum hydride (9.0 g.) in 200 ml. of anhydrous ether, ethyl 5-bromonicotinate (54.7 g.) dissolved in 230 ml. of anhydrous ether was added during 85 minutes at a temperature of 0–10° C. To the yellow reaction mixture 45 ml. of a saturated aqueous sodium sulfate solution was then added and the precipitated salts was immediately filtered off and washed with ether. The combined washings and filtrate was dried over anhydrous sodium sulfate, filtered and the solvent evaporated until a small amount of a red solution was obtained. This solution was treated with hydrogen chloride in ether and the hydrochloride formed was immediately recrystallized from ethanol. The product, thus isolated as the hydrochloride weighed 13.0 g. M.P. 137° C., also characterized by its IR spectrum.

Analysis.—Found (percent); Cl, 15.9. Calculated for $C_6H_7NOBrCl$ (percent); Cl, 15.8.

EXAMPLE 30

5-fluoro-3-pyridinemethanol

The starting material 5-fluoro-3-cyanopyridine, M.P. 53–54.5° C., was prepared by dehydration of the known 5-fluoronicotinamide with phosphorus pentaoxide.

5-fluoro-3-cyanopyridine (1.50 g.) was dissolved in a mixture of 2.5 ml. of concentrated hydrochloric acid and 25 ml. of water and hydrogenated at atmospheric pressure and room temperature over 10% Pd/C (0.40 g.). After 8 hours 535 ml. of hydrogen had been consumed. The hydrogenation was interrupted for 3 days and then further hydrogenated during one hour over an additional amount of 10% Pd/C (0.30 g.). A total amount of 600 ml. of hydrogen was consumed. The catalyst was filtered off and washed with water. The combined filtrate and washings were concentrated to a volume of 25 ml. made alkaline by addition of solid sodium hydrogen carbonate and extracted five times with 40 ml. of butyl acetate. The extract was dried over anhydrous sodium sulfate, filtered and the solvent evaporated to give an oily residue, which was transformed to a hydrochloride salt. This product, which was colourless, weighed 1.42 g. and had an IR spectrum which was identical with the one obtained from the product according to Example 26.

EXAMPLE 31

5-fluoro-3-pyridinemethanol 5-fluoronicotinic acid (3.00 g.) was refluxed 4 hours with 30 ml. of thionyl chloride and the excess of thionyl chloride evaporated in vacuo. The 5-fluoronicotinic acid chloride thus obtained was dissolved in 30 ml. of diglyme and treated while stirring with sodium borohydride (2.40 g.), first 15 minutes at 35° C. and then 30 minutes at 80° C. The mixture was poured out on ice and carefully acidified with diluted aqueous hydrochloric acid. The aqueous solution was washed with two portions of ether and its volume reduced in vacuo to about 50 ml. It was then made alkaline with aqueous ammonium and extracted with five portions of chloroform. The chloroform solution was dried over anhydrous sodium sulfate, filtered and the solvent evaporated to give an oily product, which was transformed to a hydrochloride salt. The dry salt weighed 1.35 g. and had an IR spectrum which was identical with the one obtained from the product prepared according to Example 26.

EXAMPLE 32

5-fluoro-3-pyridinemethanol

The starting material S-benzyl 5-fluoro-3-pyridinecarbothioate M.P. 42–44° C., was prepared by the reaction of 5-fluoronicotinoyl chloride with benzylmercaptan.

S-benzyl 5-fluoro-3-pyridinecarbothioate (1.00 g.) was stirred 3 hours at room temperature with freshly prepared Raney-nickel (W4, 10 g.) in 70 ml. of ethanol. The metal was filtered off and thoroughly washed with ethanol. To the combined filtrate and washings were added a small excess of hydrogen chloride in ether. Evaporation of the solvent in vacuo gave the hydrochloride salt, which was washed with ether and air-dried. The colourless product weighed 0.43 g. and had an IR spectrum which was identical with the one obtained from the product according to Example 26.

EXAMPLE 33

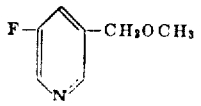

5-fluoro-3-methoxymethylpyridine

The starting material 5-fluoro-3-chloromethylpyridine hydrochloride was prepared by reacting 5-fluoro-3-pyridinemethanol with thionylchloride.

5-fluoro-3-chloromethylpyridine hydrochloride (15.0 g.) was converted to its base form by treatment with aqueous sodium hydrogen carbonate and the base collected by extraction with benzene. The residue after evaporation of the solvent was dissolved in 40 ml. of methanol. This solution was added drop by drop to a stirred solution made by the addition of sodium (4.0 g.) to 100 ml. of methanol. The reaction mixture was refluxed one hour and the solvent evaporated in vacuo. The residue was extracted with ether and the ether solution extracted twice with water. The water solution was extracted twice with ether and this ether solution combined with the original ether solution. The final ether solution was dried over potassium carbonate, filtered and the solvent evaporated to give 8.5 g. oil. Distillation at reduced pressure gave 6.6 g. colourless liquid, B.P. 70–72° C./12.5 mm. Hg, $n_D^{25}=1.4793$.

Analysis.—Found (percent); C, 60.25; H, 5.84; F, 13.09; N, 9.74. Calculated for $C_7H_8FNO$ (percent): C, 59.56; H,5.71; F, 13.46; N, 9.93.

EXAMPLE 34

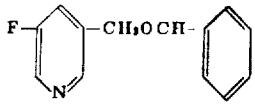

5-fluoro-3-pyridinemethyl benzyl ether

The starting material 5-fluoro-3-chloromethylpyridine was prepared by reacting 5-fluoro-3-pyridinemethanol with thionyl chloride and subsequent isolation of the base. Yield 94%.

Sodiumhydride (2.70 g., 50% dispersion in oil) was added in portions during one hour at room temperature, 75 ml. of freshly distilled benzyl alcohol. The mixture was continuously stirred and kept under nitrogen. The formation of foams was largely prevented by a small addition of diethyl ether (10 ml.). To the stirred mixture kept under nitrogen, a solution of 5-fluoro-3-chloromethylpyridine (8.39 g.) in 25 ml. of freshly distilled benzylalcohol was added during 10 minutes at room temperature. The stirred mixture, with 20 ml. of diethylether added, was refluxed for 18 hours and was then cooled to room temperature. The precipitate of sodium chloride was filtered off and the filtrate, after evaporation of the solvents, distilled in vacuo. It was obtained 8.40 g., B.P. 122–128° C./0.15 mm. Hg. This product was dissolved in cold 5 M hydrochloric acid. The acidic solution was extracted with three portions of petroleum ether and then made alkaline by addition of an excess of aqueous ammonia. The alkaline solution was extracted with four portions of diethylether. The ether solution was dried over anhydrous magnesium sulfate, filtered and the solvent evaporated to give 7.76 g. yellow oil. Distillation in vacuo gave 6.81 g. colourless liquid, B.P. 125–127° C./0.15 mm. Hg, $n_D^{25}$=1.5451.

Analysis.—Found (percent): C, 71.51; H, 5.78; F, 9.06; N, 6.41. Calculated for $C_{13}H_{12}FNO$ (percent): C, 71.87; H, 5.57; F, 8.75; N, 6.45.

EXAMPLE 35

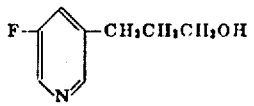

To a suspension of lithium aluminum hydride (1.7 g.) in 150 ml. ether, methyl 5-fluoro-3-pyridinepropionate (4.0 g.) in 50 ml. of ether was added with stirring and ice-cooling during 30 minutes. The mixture was stirred at room temperature for 30 minutes and then gently refluxed for one hour. After cooling, the excess hydride was destroyed by the addition of 10 ml. of saturated aqueous sodium sulfate. The precipitated salts was filtered off, washed twice with ether, and the combined washings and filtrate dried over anhydrous sodium sulfate. Filtering and evaporation of the solvent gave 3.8 g. oil, which was distilled twice to give 1.6 g. colourless product, B.P. 86–88° C./0.02 mm. Hg, $n_D^{25}$=1.5076.

Analysis.—Found (percent): C, 61.71; H, 6.48; N, 9.20. Calculated for $C_8H_{10}FNO$ (percent): C, 61.92; H, 6.50; N, 9.03.

EXAMPLE 36

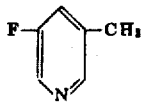

5-fluoro-3-methylpyridine 5-fluoro-3-pyridinemethanol hydrochloride (5.05 g.) was dissolved in a mixture of 50 ml. ethanol and 2 ml. of concentrated aqueous hydrochloride acid and hydrogenated over 0.5 g. of 10% Pd/C at room temperature and atmospheric pressure. A total amount of 740 ml. of hydrogen was absorbed. The catalyst was filtered off, and the solvent of the filtrate evaporated. The residue was dissolved in water made alkaline with solid sodium hydroxide and the product isolated by steam distillation. 3 g. colourless product was separated and dried over sodium carbonate. The structure of the compound was confirmed by NMR spectroscopy.

EXAMPLE 37

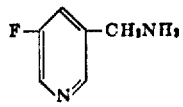

5-fluoro-3-aminomethylpyridine

The starting material 5-fluoro-3-cyanopyridine was prepared by dehydration of 5-fluoronicotinamide.

5-fluoro-3-cyanopyridine (8.0 g.) was hydrogenated at 45 p.s.i. and room temperature over rhodium on alumina (5%) in 160 ml. of a solution of 10% ammonia in ethanol. When the hydrogen absorption had ceased, the catalyst was filtered off and the solvent of the filtrate evaporated to give 7.3 yellow oil. Distillation twice at reduced pressure gave 2.35 g., B.P. 93–94° C./14 mm. Hg, $n_D^{25}$=1.520.

Analysis.—Found (percent): C, 56.21; H, 5.68; F, 15.31; N, 22.53. Calculated for $C_6H_7FN_2$ (percent): C, 57.13; H, 5.60; F, 15.06; N, 22.21.

EXAMPLE 38

5-fluoro-3-aminomethylpyridine

The starting material 5-fluoro-3-pyridinemethylazide (B.P. 98–99° C./15 mm. Hg, $n_D^{25}$=1.523) was prepared by reacting 5-fluoro-3-chloromethylpyridine (prepared by the treatment of 5-fluoro-3-pyridinemethanol with thionyl chloride) with sodium azide.

5-fluoro-3-pyridinemethylazide (3.2 g.) was hydrogenated over 10% Pd/C (0.32 g.) at room temperature and a pressure of 3.5 atm. in a mixture of 25 ml. 2 M hydrochloric acid and 100 ml. of 50% aqueous methanol. When the hydrogen absorption had ceased (4 hours) the catalyst was filtered off and the solvent evaporated to give a yellow semi-solid material. This material crystallized from aqueous ethanol to give 1.2 g. colourless dihydrochloride, M.P. 223–225° C.

Analysis.—Found (percent): Cl, 35.6. Calculated for $C_6H_7FN_2 \cdot 2HCl$ (percent): Cl, 35.6.

EXAMPLE 39

5-fluoro-3-aminomethylpyridine

The starting material 5-fluoro-3-pyridinemethyl phthalimide (M.P. 131.5–132.5° C.) was prepared by reaction of 5-fluoro-3-chloromethylpyridine (preparation, see Example 33) with potassium phtalimide.

5-fluoro-3-pyridinemethyl phthalimide (3.4 g.) and hydrazine hydrate (0.66 g.) was refluxed for 2 hours in 20 ml. ethanol. The reaction mixture was allowed to cool and then treated with concentrated aqueous hydrochloride acid to a pH of about 1. After warming the mixture 1 hour at the steambath, it was filtered and the solvent evaporated to give a solid residue. This material was triturated with ethanol to give 1.9 g. crystalline dihydrochloride, which was identical with the product prepared in Example 38.

EXAMPLE 40

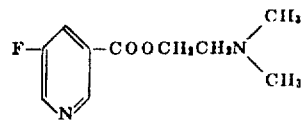

5-fluoronicotinic acid (12.7 g.) was refluxed for 4.5 hours with 100 ml. of thionyl chloride and then the excess of thionyl chloride was evaporated at reduced pressure. The 5-fluoronicotinic acid chloride so obtained was stirred with ice-cooling in 200 ml. of dry benzene and to this mixture a solution of N,N-dimethylaminoethanol (8.05 g.) in a mixture of 30 ml. triethylamine and 50 ml. of dry benzene was added during one hour. The reaction mixture was stirred at 80° C. for two hours and then the precipitate was filtered off. The solvent of the filtrate was evaporated to give a brown semi-solid material, which was treated with an excess of aqueous sodium hydrogen carbonate. The mixture was extracted with four portions (100 ml.) of ether. The ether solution was dried over anhydrous sodium sulfate, filtered, and the solvent evaporated to give 13.1 g. brown liquid. This was distilled at 0.03 mm. Hg to give 10.2 g. nearly colourless liquid, B.P. 85–87° C., $n_D^{25}$= 1.4894;

Equivalent weight—Found: 216. Calculated: 212. The product identity was established by NMR measurements.

EXAMPLE 41

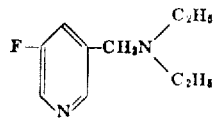

5-fluoro-3-(N,N-diethylaminomethyl)-pyridine

To lithium aulminumhydride (1.38 g.) in 150 ml. of dry ether a solution of 5-fluoro-N,N-diethylnicotinamide (14.7 g.) in 150 ml. of dry ether was added at such a rate that a steady reflux was maintained. The reaction mixture was refluxed further for one hour and was then cooled in ice-water. The excess of hydride was destroyed by addition of 9.4 ml. of a saturated aqueous solution of sodoum sulfate. The precipitated inorganic salts were filtered off and soaked with boiling ether. The combined ether solutions were dried over anhydrous potassium carbonate, filtered and the solvent evaporated to give 10.8 g. orange oil. A pure product was obtained by distillation at reduced pressure: obtained 2.2 g., B.P. 98–101° C./13 mm. Hg, $n_D^{25}$=1.4820.

Analysis.—Found (percent): C, 65.88; H, 8.33; F, 10.76; N, 15.43. Calculated for $C_{10}H_{15}FN_2$ (percent): C, 65.90; H, 8.30; F, 10.43; N, 15.37.

EXAMPLE 42

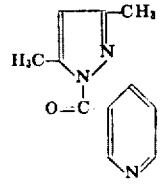

1-nicotinoyl-3,5-dimethylpyrazole

Nicotinic acid hydrazide (3.4 g.), acetylacetone (2.5 g.), 2 M hydrochloric acid (0.19 ml.) and 2-propanaol (25 ml.) was refluxed for one hour and the solution allowed to stand over night. Evaporation of the solvent gave 4.9 g. yellow oil which soon became crystalline. The product was triturated with 25 ml. of water to give 4.2 g. colourless material, M.P.43–44° C.

Analysis.—Found (percent): C, 64.95; H, 5.58; N, 21.44; O, 8.34. Calculated for $C_{11}H_{11}N_3O$ (percent): C, 65.66; H, 5.51; N, 20.88; O, 7.95.

EXAMPLE 43

Meso-inositol hexa-5-fluoronicotinate

To a stirred mixture of 5-fluoronicotinic acid (8.5 g.), meso-inositol (0.9 g.) and dry pyridine (20 ml.) p-toluenesulfonyl chloride (7.0 g.) was added in small portions while the reaction mixture was cooled in cold water. When a too thick precipitate had formed a further 10 ml. portion of dry pyridine was added. The mixture was stirred one hour at room temperature and one hour at about 110° C. and was then cooled in room temperature. The precipitate was filtered off and dried to give 3.0 g. colourless product, M.P. 220–230° C. A further 2.4 g. colourless product, M.P. 217–227° C. was obtained by precipitating from the filtrate by addition to ice-water. Through recrystallization from pyridine-ethanol the melting point of the product could be raised to 228–231° C.

Analysis.—Found (percent: N, 9.00. Calculated for $C_{36}H_{24}F_6N_6O_{12}$ (percent): N, 9.15.

EXAMPLE 44

Triethanolamine tri-5-fluoronicotinate 5-fluoronicotinic acid (8.5 g.) was refluxed with 100 ml. of thionyl chloride for 4.5 hours and then the excess of the reagent was evaporated in vacuo. The 5-fluoronicotinic acid chloride thus obtained was stirred with a mixture of 30 ml. of dry benzene and 30 ml. of dry pyridine and to this mixture triethanolamine (3.1 g.) was added slowly at room temperature. After the addition the reaction mixture was refluxed during two hours and was allowed to stand at room temperature over night. The mixture was poured out on ice-water and made alkaline by the addition of an excess of aqueous sodium hydrogen carbonate and extracted with three portions (75 ml.) of benzene. The combined benzene solutions were washed with two portions (100 ml.) of a saturated aqueous solution of sodium chloride and dried over anhydrous sodium sulfate. The solvent was evaporated and the residue triturated with petroleum ether and recrystallized from 2-propanol. Yield of recrystallized product 1.7 g., M.P. 61–63.5° C. The identity of the product was established by NMR analysis.

EXAMPLE 45

Pharmacological tests

Compounds according to the invention were tested with regard to lowering the concentration of free fatty acids in the serum of dogs according to the method described in Carlsson, L. A. and Liljedahl, S. O., "Lipid metabolism and trauma. II. Studies on the effect of nicotinic acid on norepinephrine induced fatty liver." Acta Med. Scand. 173 (1963), 787–791 and Bergstrom, S., Carlsson, L. A. and Orö, L. "Effect of prostaglandins on catecholamine induced changes in the free fatty acids of plasma and in blood pressure in the dog. Prostaglandin and related factors 22," Acta Physiol. Scand. 60 (1964), 170–180. In this method the compound is tested on a model for the stress situation, in which noradrenaline stimulated lipid mobilization is known to occur.

Anaesthetized dogs were given continuous intravenous infusions of noradrenaline at a constant rate (0.5 μg./kg. bodyweight and minute). The test substance was injected intravenously 60 min. after the start of infusion. The arterial level of free fatty acids as a function of time was followed. Nicotinic acid was used as reference. The qualitative effect is given in Table I.

The qualitative effect was judged from the total depression of free fatty acid serum concentration and the duration of the depression.

TABLE I

| Compound | Qualitative effect |
|---|---|
| Nicotinic acid (reference) | +++ |
| 5-chloronicotinic acid | +++ |
| 5-fluoronicotinic acid | ++++ |
| 5-fluoronicotinic acid methylester | ++ |
| 5-fluoronicotinic acid ethylester | ++++ |
| 5-fluoronicotinic acid n-butylester | +++ |
| 5-fluoronicotinic acid n-hexylester | +++ |
| 5-fluoronicotinic acid p-undecylester | +++ |
| 5-fluoronicotinic acid i-propylester | ++++ |
| 5-fluoronicotinic acid allyester | ++ |
| 5-fluoronicotinic acid cyclohexylester | +++± |
| 5-chloronicotinic acid ethylester | + |

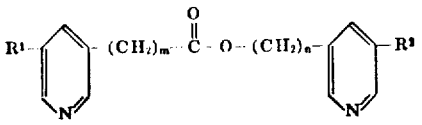

| m | n | $R^1$ | $R^2$ | |
|---|---|---|---|---|
| 0 | 1 | F | H | ++++ |
| 0 | 1 | H | F | ++++ |
| 0 | 1 | F | F | ++++ |
| 0 | 1 | Cl | H | ++++ |
| 0 | 1 | H | Cl | ++++ |
| 1 | 1 | H | H | ++++ |
| 1 | 1 | H | F | ++++ |
| 1 | 1 | H | Cl | ++++ |
| 1 | 2 | H | H | ++++ |
| 3 | 1 | H | F | ++++ |

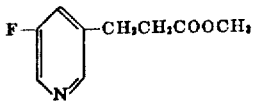

+

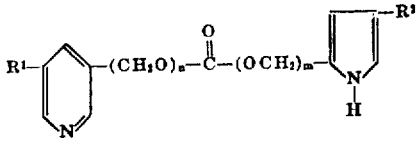

| m | n | $R^1$ | $R^2$ | |
|---|---|---|---|---|
| 0 | 1 | H | $CH_3$ | ++++ |
| 0 | 1 | F | $CH_3$ | ++++ |
| 1 | 0 | F | $CH_3$ | ++++ |

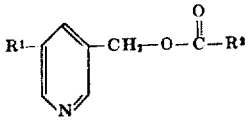

| $R^1$ | $R^2$ | |
|---|---|---|
| F | $CH_3$ | ++++ |
| F | $(CH_3)_3C$ | ++++ |
| F | $CH_2{=}CH{-}CH_2$ | ++++ |
| Cl | $CH_3CH_2$ | + |

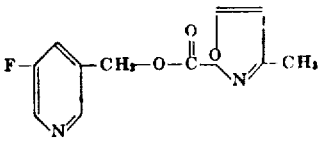

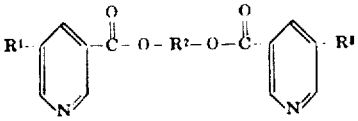

| Compound $R^1$ | $R^3$ | $R^2$ | Qualitative effect |
|---|---|---|---|
| F | F | $-CH_2-CH_2-$ | ++++ |
| H | F | $-CH_2-CH_2-$ | ++++ |
| F | F | $-(CH_2)_2-$ | +++ |
| F | F | $-CH-CH_2-$ | +++ |
| F | F | 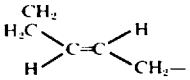 | +++ |

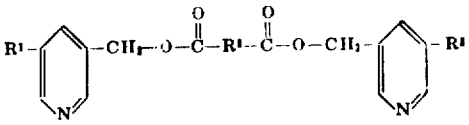

| $R^1$ | $R^3$ | $R^2$ | |
|---|---|---|---|
| F | F | $-CH_2-CH_2-$ | ++++ |
| F | F | $-(CH_2)_4-$ | ++++ |
| F | F | $-(CH_2)_5$ | ++++ |
| F | F | $-CH{=}CH$-(trans.) | ++++ |

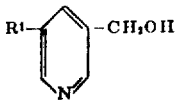

| $R^1$ | | |
|---|---|---|
| F | ++++ | |
| Cl | + | |
| Br | + | |

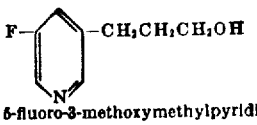

+

5-fluoro-3-methoxymethylpyridine ..... +++

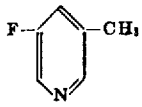

++++

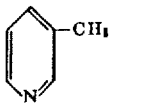

+++

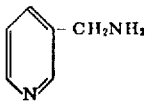

+++

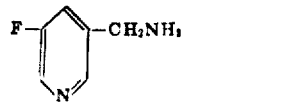

++++

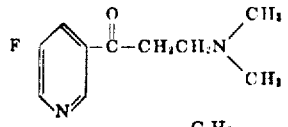

+++

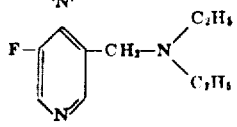

+

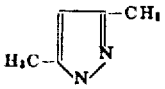

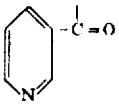

+++

Meso-inositolhexa-5-fluoronicotinate ..... +
Triethanolamine tri-5-fluoronicotinate ..... +++

5-chloronicotinic acid and 5-fluoronicotinic acid have a low toxicity. For instance the toxicity of 5-fluoronicotinic acid upon i.p. administration in mice given as the $LD_{50}$-value was found to be 2.0 g./kg. bodyweight. The corresponding toxicity of nicotinic acid was found to be 0.5 g./kg. bodyweight.

The resorption of 5-chloro- and 5-fluoronicotinic acid in serum of dogs was studied. 200 mg. of the test compound were orally administered to the dog in the form of a tablet also containing 200 mg. of physiologically inert material. The amount of the test compound in the blood serum was analyzed at different times according to Hughes, D. E. and Williamson, D. H., Biochem. J. 55 (1953), 851. A comparison with nicotinic acid was made in each case. The maximum resorption and the duration (given as the time after administration when the serum concentration had decreased to 25% of the maximum concentration) is given in Table IV.

TABLE IV

| Compound | Maximum resorption γ/ml.serum | Duration, hr. |
|---|---|---|
| 5-fluoronicotinic acid | 59.3 | 7.2 |
| Nicotinic acid | 53.2 | 1.9 |
| 5-chloronicotinic acid | 66.8 | 4.6 |
| Nicotinic acid | 36.7 | 1.6 |

The resorption of pyridine methanols in serum of dogs was also studied. 100–200 mg. of the substance to be tested was orally administered to the dog in the form of a tablet or a capsule. The amount of the test compound was analyzed as the corresponding nicotinic acid derivative (the metabolism to these acids is very rapid) at different times according to Hughes, D. E. and Williamson, D. H., Biochem. J. 55 (1953), 851. A comparison with the unsubstituted analogue was made. The maximum resorption and the duration (given as the time after administration when the serum concentration had decreased to 25% of the maximum concentration) of compounds of Formula I, wherein R has specified significance is given in Table II.

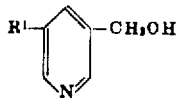

I

TABLE II

| R' | Administered amount, g. | Way of administration | Maximum resorption, γ/ml.serum | Duration, hr. |
|---|---|---|---|---|
| F | 0.2 | Tablet | 47.6 | 3.5 |
| H | 0.2 | " | 32.2 | 1.7 |
| Cl | 0.2 | Capsule | 45.7 | 4 |
| H | 0.2 | " | 32.2 | 1.7 |
| Br | 0.1 | " | 80.7 | 2.2 |

These compounds have a low toxicity as may be seen from Table III below, wherein the toxicity in mice upon intraperitoneal administration of a compound of the Formula I wherein R has the specified significance is given.

TABLE III

| | Toxicity (i.p.) $LD_{50}$ g./kg mice |
|---|---|
| F | 2 |
| Cl | 0.5 |
| Br | 0.5 |

The compound 5-fluoro-3-pyridinemethanol was also tested with respect to its vasodilating properties. Changes in the peripheral blood flow of one hind leg of cat was recorded as follows:

The blood of the femoral artery was bypassed in a loop of polyethylene tubing inserted into the artery. The blood flow through the loop was adjusted by a digital pump. Just distal of the pump arterial pressure was measured. The pressure recorded is then dependent on the pump flow and the resistance distally of the pump. If the flow is kept constant the pressure changes will thus reflect changes in the peripheral resistance.

Intraarterial injections of 5-fluoro-3-pyridinemethanol (0.1% solution in isotonic sodium chloride solution, 1 mg. substance/min.) gave 23% decrease in the vascular resistance.

In clinical practice the compounds of the invention will normally be administered orally or by injection in the form of pharmaceutical preparations comprising the active ingredient either as a free base or as a therapeutically acceptable acid addition salt, e.g. the hydrochloride, hydrosulphate, or the like, in association with a pharmaceutically acceptable carrier. Accordingly, terms relating to the novel compounds of this invention whether generically or specifically are intended to include both the free base and the acid addition salts of the free base, unless the content in which such terms are used, e.g. in the specific examples, would be inconsistent with the broad meaning. The carrier may be a solid, semisolid or liquid diluent or an ingestible capsule. These pharmaceutical preparations constitute a further aspect of this invention. Usually the active substance will constitute between 0.1 and 95% by weight of the preparation, more especially between 0.5 and 20% by weight for preparations intended for injection and between 2 and 50% by weight for preparations suitable for oral administration.

To produce pharmaceutical preparations containing a compound of the invention in the form of dosage units for oral application, the selected compound may be mixed with a solid pulverulent carrier, e.g. lactose, saccharose, sorbitol, mannitol; starches such as potato starch, corn starch or amylopectin; cellulose derivatives, or gelatin, and a lubricant such as magnesium stearate, calcium stearate, a polyethylene glycol wax and the like, and then compressed to form tablets. If coated tablets are required, the cores, prepared as described above, may be coated with a concentrated sugar solution which may, for example, contain gum arabic, gelatin, talcum, titanium dioxide, or the like. Alternatively, the tablet can be coated with a lacquer dissolved in a readily volatile organic solvent or mixture of organic solvent. Dyestuffs may be added to these coatings in order to readily distinguish between tablets containing different active components or different amounts of the active compound.

By using several layers of the active drug, separated by slowly dissolving coated sustained release tablets are obtained. Another way of preparing sustained release tablets is to divide the dose of the active drug into granules with coats of different thickness and compress the granules into tablets together with the carrier substance. The active substance can also be incorporated in slowly dissolving tablets made for instance of fat and wax substances or evenly distributed in a tablet of an insoluble substance such as a physiologically inert plastic substance.

Effervescent powders are prepared by mixing the active ingredient with non-toxic carbonates or hydrogen carbonates, such as calcium carbonate, potassium carbonate and potassium hydrogen carbonate, solid, non-toxic acids such as tartaric acid and citric acid, and for example aroma.

For the preparation of soft gelatin capsules (pearl shaped closed capsules) consisting of gelatin and for example glycerol or similar closed capsules, the active substance may be admixed with a vegetable oil. Hard gelatin capsules may contain granulates of the active substance in combination with solid, pulverulent carriers such as lactose, saccharose, sorbitol, mannitol, a starch (e.g. potato starch, corn starch or amylopectin) a cellulose derivative or gelatin.

Liquid preparations for oral application may be in the form of syrups or suspensions, for example solutions containing from 0.2% to 20% by weight of the active substance, the balance being sugar and a mixture of ethanol, water, glycerol, and propylene-glycol. Optionally such liquid preparations may contain colouring agents, flavouring agents, saccharin and carboxymethyl-cellulose as a thickening agent.

Solutions for parenteral application by injection can comprise aqueous solutions of a water-soluble pharmaceutically acceptable salt of the active substance, preferably in a concentration of 0.5% to 10% by weight. These solutions may also contain stabilizing agents and/or buffering agents, and may conveniently be provided in various dosage unit ampoules.

EXAMPLE 46

Preparation of soft gelatin capsules containing 5-fluoronicotinic acid ethylester 500 g. of 5-fluoronicotinic acid ethylester were mixed with 500 g. of corn oil whereafter the mixture was filled in soft gelatin capsules, each capsule containing 100 mg. of mixture (i.e. 50 mg. of active substance).

EXAMPLE 47

Preparation of soft gelatin capsules containing 5-fluoronicotinic acid methylester 500 g. of 5-fluoronicotinic acid methylester were mixed with 750 g. of peanut oil whereafter the mixture was filled in soft gelatin capsules, each capsule containing 125 mg. of mixture (i.e. 50 mg. of active substance).

EXAMPLE 48

Preparation of tablets containing 5-fluoronicotinic acid ethylester 50 kg. of 5-fluoronicotinic acid ethylester were mixed with 20 kg. of silicon dioxide of the trademark Aerosil, whereafter 45 kg. of potato starch and 50 kg. of lactose were mixed in and the mixture moistened with a starch paste perpared from 5 kg. of potato starch and distilled water, whereafter the mixture was granulated through a sieve. The granulate was dried and sieved whereafter 2 kg. of magnesium stearate were mixed in. Finally the mixture was pressed into tablets, each weighing 172 mg.

EXAMPLE 49

Preparation of an emulsion containing 5-fluoronicotinic acid ethylester 100 g of 5-fluoronicotinic acid ethylester were dissolved in 2500 g. of peanut oil. From the solution thus obtained, 99 g. of gum arabic, aroma and colour (q.s.) and 2500 g. of water and emulsion was prepared.

EXAMPLE 50

Preparation of a syrup containing 5-fluoronicotinic acid isopropylester 100 g of 5-fluoronicotinic acid allylester were dissolved in 300 g. of 95% ethanol where 300 g. of glycerol, aroma and color (q.s.) and water 1.000 ml. were mixed in. A syrup was thus obtained.

EXAMPLE 51

Preparation of a solution containing 5-fluoronicotinic acid ethylester 100 g of 5-fluoronicotinic acid ethylester were dissolved in 2.000 g of polyoxyethylene sorbitan monooleate, whereafter aroma and colour (q.s.) and water to 5.000 ml. were mixed in. A clear drop solution was thus obtained.

EXAMPLE 52

Preparation of a syrup containing vitamins and 5-fluoronicotinic acid

The syrup was prepared from the following ingredients:

5-fluoronicotinic acid—7.0 g.
Polyoxyethylenesorbitol monooleate—0.4 g.
Vitamin A—12.000 IE
Vitamin C—2 g.
Vitamin $B_1$—50 mg.
Vitamin $B_2$—70 mg.

Vitamin $B_6$—10 mg.
Pantothenol—100 mg.
Caffin—300 mg.
Sorbitol—20 mg.
Aroma, colour—q.s.
Water to 100 ml.

Vitamin A was dissolved in the polyoxyethylene sorbitan monooleate while heating to about 60° C., whereafter 20 ml. of water was mixed in. The caffeine was dissolved in 10 ml. of water, while heating to about 90° C. The remaining ingredients were mixed in about 60 ml. of water, whereafter the vitamin A and caffeine solutions were added while stirring. The pH was adjusted to 4.5–5.5 by addition of sodium hydroxide solution and the syrup made up to 100 ml. with water. The whole procedure was carried out in nitrogen atmosphere. A normal dose is contained in 15 ml. of the syrup.

EXAMPLE 53

Preparation of effervescent tablets containing 5-chloronicotinic acid 100 g. of 5-fluoronicotinic acid, 140 g. of finely divided citric acid, 110 g. of finely divided sodium hydrogen carbonate, 3.5 g. of magnesium stearate and aroma (q.s.) were mixed and the mixture was pressed into tablets, each containing 100 mg. of active substance.

EXAMPLE 54

Preparation of a drop solution containing 5-fluoronicotinic acid 100 g. of 5-fluoronicotinic acid were mixed with 300 g. of ethanol, whereafter 300 g. of glycerol, water to 1.000 ml. aroma and colour (q.s.) and 0.1 N sodium hydroxide solution (to pH 4.5–5.5) were added while stirring. A drop solution was thus obtained.

EXAMPLE 55

Preparation of a sustained release tablet containing 5-fluoronicotinic acid 200 g. of 5-fluoronicotinic acid were melted together with 50 g. of stearic acid and 50 g. of carnauba wax. The mixture thus obtained was cooled and ground to a particle size of at most 1 mm. (diameter). The mass thus obtained was mixed with 5 g. of magnesium stearate and pressed into tablets each weighing 305 mg. Each tablet thus contains 200 mg. of active substance.

We claim:

1. A compound of the structural formula

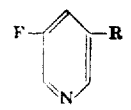

and therapeutically acceptable salts thereof, wherein R is selected from the class consisting of $-CH_2OH$; [ $-COOCH_3$; ] $-COOC_2H_5$; [ $-COOC_4H_9$; $-COOC_6H_{13}$; $-COOC_{11}H_{23}$; ]

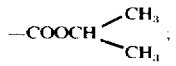

[ $-COOCH_2-CH=CH_2$ ]

$-CH_2OCOCH_3$; $-CH_2OCOC(CH_3)_3$; [ $-CH_2OCOCH_2-CH_2=CH_2$ ] $-CH_2OCOCH_2-CH=CH_2$; and $-CH_2OCO(CH_2)_6CH_3$.

2. 5-fluoro-3-pyridinemethanol, and its therapeutically acceptable salts.

* * * * *

UNITED STATES PATENT AND TRADEMARK OFFICE

CERTIFICATE OF CORRECTION

PATENT NO. : RE 28,532

DATED : August 26, 1975

INVENTOR(S) : Lars Anders Fritz Carlsson et al.

It is certified that error appears in the above-identified patent and that said Letters Patent are hereby corrected as shown below:

Col. 2, line 24, "1[" should read -- H --;

Col. 3, line 31, "CH" should read -- $CH_2$ --;

Col. 4, line 61, "COO1" should read -- COOH --;

Col. 6, line 9, "]I" should read -- H --;

Col. 6, line 15, "$(CH_2)_2$" should read -- $(CH_2)_q$ --;

Col. 8, line 6, "D X" should read -- D-X --;

Col. 8, line 54, "X-D-X" should appear in the center of the preceding line;

Col. 9, line 29, the short line going up from "N" is missing;

Col. 9, line 48, "benrenesulphonic" should read -- benzenesulphonic --;

Col. 9, lines 51-55, " 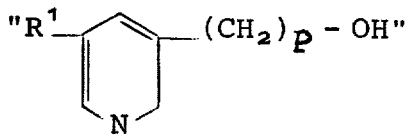 "

should read -- 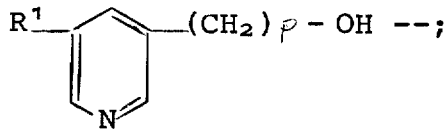 --;

Col. 11, line 61, "$R^1$" should read -- $R^2$ --;

Col. 11, line 64, "$R^1$" should read -- $R^3$ --;

Col. 12, line 1, "$R^1$" should read -- $R^2$ --;

Col. 12, line 3, "$R^1$" should read -- $R^3$ --;

Col. 12, line 28, "tetahydrofuran" should read -- tetrahydrofuran --

Col. 12, line 62, "$R^3$" should read -- $R^2$ --;

Col. 13, line 12, at the end of the line, insert -- XV --;

UNITED STATES PATENT AND TRADEMARK OFFICE

CERTIFICATE OF CORRECTION

PATENT NO. : RE 28,532

DATED : August 26, 1975

INVENTOR(S) : Lars Anders Fritz Carlsson et al.

It is certified that error appears in the above-identified patent and that said Letters Patent are hereby corrected as shown below:

Col. 13, line 15, "carboxylakyl" should read -- carboxyalkyl --;
Col. 13, line 40, "][" should read -- H --;
Col. 13, line 43, "X" should read -- -X --;
Col. 15, line 1, "$(CH_2)_2Y$" should read -- $(CH_2)_2$-Y --;
Col. 15, line 50, etc., right side of formula printed badly.
Col. 16, line 33, "weekly" should be -- weakly --;
Col. 17, line 43, "ethano" should be -- ethanol --;
Col. 19, line 1, "4,52" should read -- 4.52 --;
Col. 19, line 10, "1,4734" should read -- 1.4734 --;
Col. 19, line 50, "57,60" should read -- 57.60 --;
Col. 22, line 44, "19.43" should read -- 19.34 --;
Col. 23, line 55, "$C_9H_{12}NO_2Cl$" should read -- $C_9H_{10}NO_2Cl$ --;
Col. 24, line 1, "was" should read -- and --;
Col. 24, line 35, "alcoline" should be -- alkaline --;
Col. 25, line 36, "Adipic" should be -- adipic --;
Col. 26, line 17, "hydrochloric" should read -- hydrochloride --;
Col. 27, line 60, "ammonium" should read -- ammonia --;
Col. 29, line 60, "hydrochloride" should read -- hydrochloric --;
Col. 30, lines 55-56, "hydrochloride" should read -- hydrochloric --;
Col. 31, line 35, "aulminumhydride" should read -- aluminumhydride --;
Col. 31, line 42, "sodoum" should read -- sodium --;
Col. 31, line 66, "2-propanaol" should read -- 2-propanol --;
Col. 32, line 27, "(percent:" should read -- (percent): --;
Col. 33, line 24, "p-undecylester" should read -- n-undecylester --;
Col. 33, line 25, "allyester" should read -- allylester --;

UNITED STATES PATENT AND TRADEMARK OFFICE

CERTIFICATE OF CORRECTION

PATENT NO. : RE 28,532

DATED : August 26, 1975

INVENTOR(S) : Lars Anders Fritz Carlsson et al.

It is certified that error appears in the above-identified patent and that said Letters Patent are hereby corrected as shown below:

Col. 33, line 26, " ++++ " should read -- ++++ --;
Col. 34, line 7, at the end of the line, insert -- ++++--;
Col. 34, line 24, "$-(CH_2)_2-$" should read -- $-(CH_2)_6-$ --;
Col. 34, line 26, "$CH_2$" should read -- $CH_3$ --;
Col. 34, line 39, "$-(CH_2)_5-$" should read -- $-(CH_2)_6-$ --;
Col. 36, line 60, "content" should be -- context --;
Col. 38, line 24, "perpared" should read -- prepared --;
Col. 38, line 36, " 99 " should read -- 90 --;
Col. 38, line 37, "and" second occurrence should read -- an --;
Col. 39, line 3, "Caffin" should read -- Caffeine --;
Col. 40, at line 35, insert

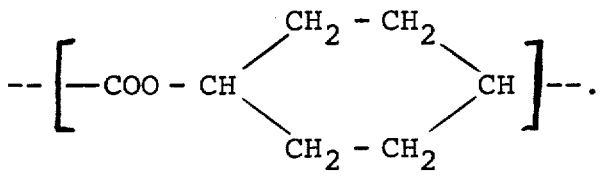

Signed and Sealed this

Seventh Day of December 1976

[SEAL]

*Attest:*

RUTH C. MASON
*Attesting Officer*

C. MARSHALL DANN
*Commissioner of Patents and Trademarks*